(12) United States Patent
Yang et al.

(10) Patent No.: US 7,625,501 B2
(45) Date of Patent: Dec. 1, 2009

(54) COLOR-CONVERTING PHOTOLUMINESCENT FILM

(75) Inventors: Maizhi Yang, North York (CA); John Wesley Moore, Richmond Hill (CA); Abdul M. Nakua, Mississauga (CA); Dan Daeweon Cheong, North York (CA); David Irvine, Bolton (CA); Xingwei Wu, Brampton (CA); James Alexander Robert Stiles, Toronto (CA); Vincent Joseph Alfred Pugliese, Oakville (CA)

(73) Assignee: Ifire IP Corporation, Fort Saskatchewan, Alberta (CA)

( * ) Notice: Subject to any disclaimer, the term of this patent is extended or adjusted under 35 U.S.C. 154(b) by 127 days.

(21) Appl. No.: 11/130,918

(22) Filed: May 17, 2005

(65) Prior Publication Data
US 2005/0261400 A1 Nov. 24, 2005

Related U.S. Application Data

(60) Provisional application No. 60/571,941, filed on May 18, 2004.

(51) Int. Cl.
*C09K 11/06* (2006.01)
*C09K 11/02* (2006.01)
(52) U.S. Cl. .............. 252/301.35; 252/301.16; 428/690; 524/590; 524/601; 524/606; 524/555; 524/593; 524/99; 524/398; 524/413
(58) Field of Classification Search .......... 428/690; 252/301.35, 301.16; 524/590, 601, 606, 524/555, 593, 99, 398, 413
See application file for complete search history.

(56) References Cited

U.S. PATENT DOCUMENTS

| 2,938,873 | A | * | 5/1960 | Kazenas | ............... 252/301.35 |
| 5,432,015 | A | | 7/1995 | Wu et al. | |
| 5,605,761 | A | | 2/1997 | Burns et al. | |
| 5,670,839 | A | | 9/1997 | Noma et al. | |
| 5,863,678 | A | * | 1/1999 | Urano et al. | ................ 430/7 |
| 6,103,006 | A | * | 8/2000 | DiPietro | ................ 106/493 |
| 6,221,517 | B1 | | 4/2001 | Eida et al. | |

(Continued)

FOREIGN PATENT DOCUMENTS

CA 2026161 12/1991

(Continued)

OTHER PUBLICATIONS

PCT International Search Report for PCT/CA2005/000756; mailed Sep. 12, 2005; Authorized Office Toby Maurice.

(Continued)

*Primary Examiner*—C. Melissa Koslow
(74) *Attorney, Agent, or Firm*—Fay Sharpe LLP

(57) ABSTRACT

An improved color-converting photoluminescent film that provides visible light emission in the red to green portion of the visible spectrum when excited by blue light. The color-converted photoluminescent film of the invention is patternable and has improved luminous efficiency and stability and is suitable for use in electroluminescent displays. The film comprises a mixture of a clear UV curable resin and photo-initiator which does not absorb blue light; and fluorescent pigment particles, wherein a molecular additive is optionally provided in to either or both of the pigment particles and curable resin. The mixture is screen printed onto a substrate to form a film and UV cured.

17 Claims, 20 Drawing Sheets

U.S. PATENT DOCUMENTS

| | | |
|---|---|---|
| 6,249,372 B1 | 6/2001 | Kobayashi et al. |
| 6,464,898 B1 * | 10/2002 | Tomoike et al. ........ 252/301.35 |
| 6,479,930 B1 * | 11/2002 | Tanabe et al. ................ 313/509 |
| 6,589,672 B1 | 7/2003 | Kobayashi et al. |
| 6,608,439 B1 | 8/2003 | Sokolik et al. |
| 6,720,091 B2 | 4/2004 | Ohnishi et al. |
| 2002/0043926 A1 | 4/2002 | Takahashi et al. |
| 2003/0011641 A1 | 1/2003 | Totman et al. |
| 2003/0015689 A1 | 1/2003 | Tomoike et al. |
| 2003/0102460 A1 | 6/2003 | Harelstad et al. |
| 2003/0104235 A1 | 6/2003 | White et al. |
| 2003/0224205 A1 | 12/2003 | Li et al. |
| 2004/0062947 A1 | 4/2004 | Lamansky et al. |
| 2004/0067387 A1 | 4/2004 | Kim et al. |
| 2004/0067388 A1 | 4/2004 | Suzuki |
| 2004/0069184 A1 | 4/2004 | Fox et al. |
| 2004/0072019 A1 | 4/2004 | Kita et al. |

FOREIGN PATENT DOCUMENTS

| | | |
|---|---|---|
| CA | 2121804 | 5/1993 |
| CA | 2305531 | 5/1999 |
| CA | 2399829 | 8/2001 |
| CA | 2419957 | 3/2002 |
| GB | 2347548 * | 9/2000 |
| WO | WO2004/03696 A2 | 4/2004 |

OTHER PUBLICATIONS

T. Shimoda, et al., "Multicolor Pixel Patterning of Light-Emitting Polymers by Ink-Jet Printing"; *SID 99 Digest*; ISSN0099-0966X/99/3001-0376; pp. 376-380; Copyright 1999 SID.

C. Hosokawa, et al., "Organic Multicolor EL Display with Fine Pixels", *SID 97 Digest*, issn0097-00966x/97/2801-1073; pp. 1073-1076; Copyright 1997 SID.

* cited by examiner

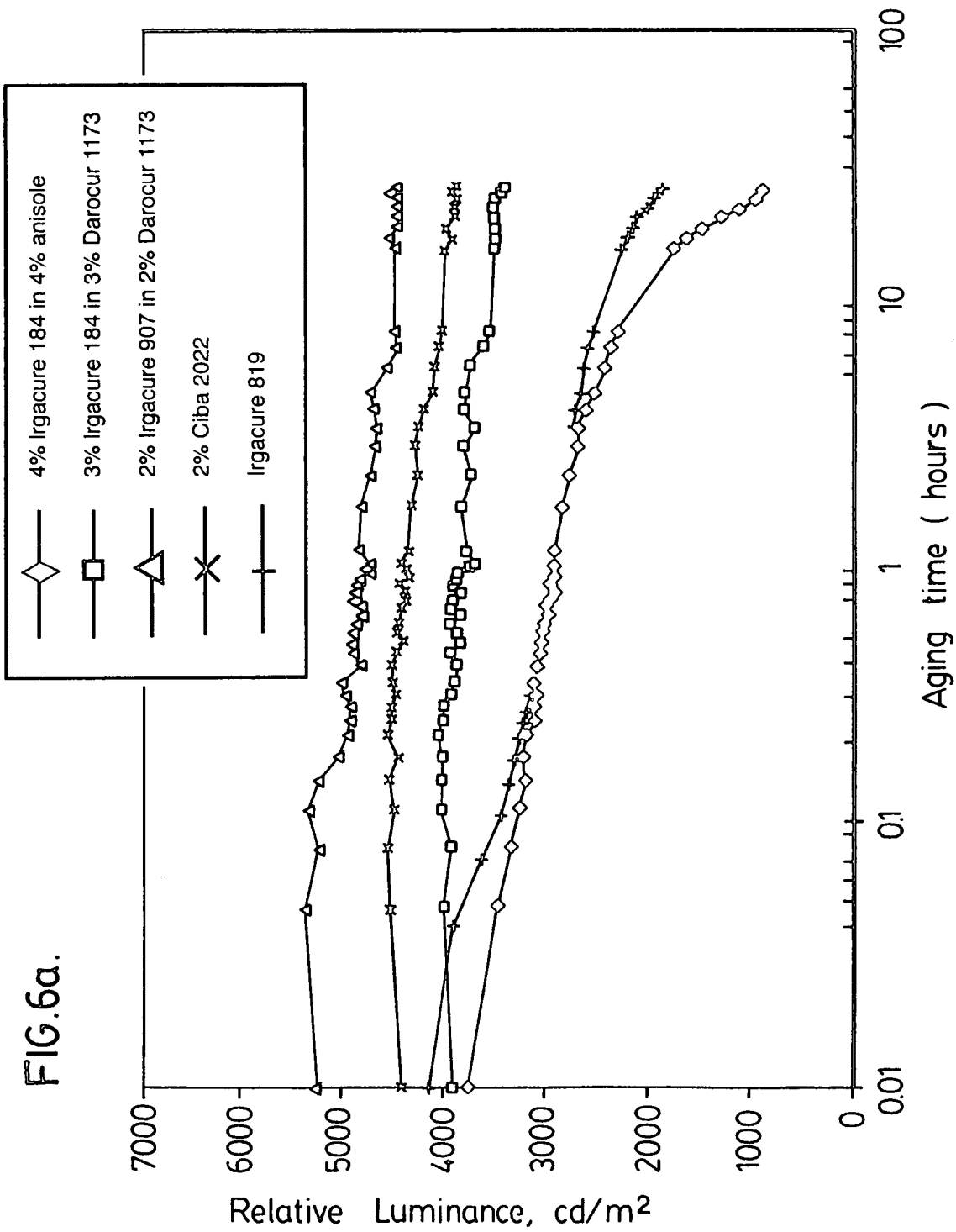

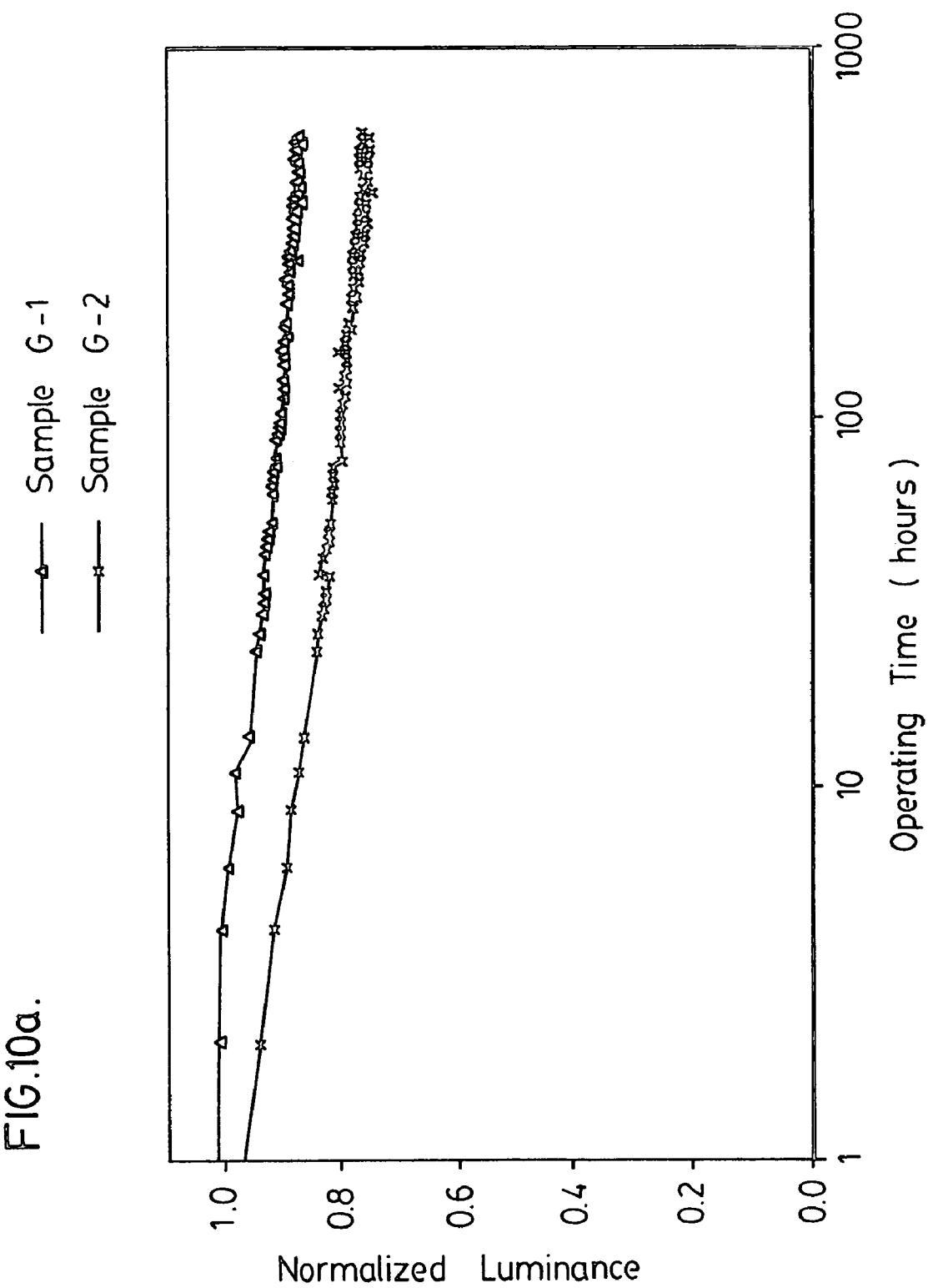

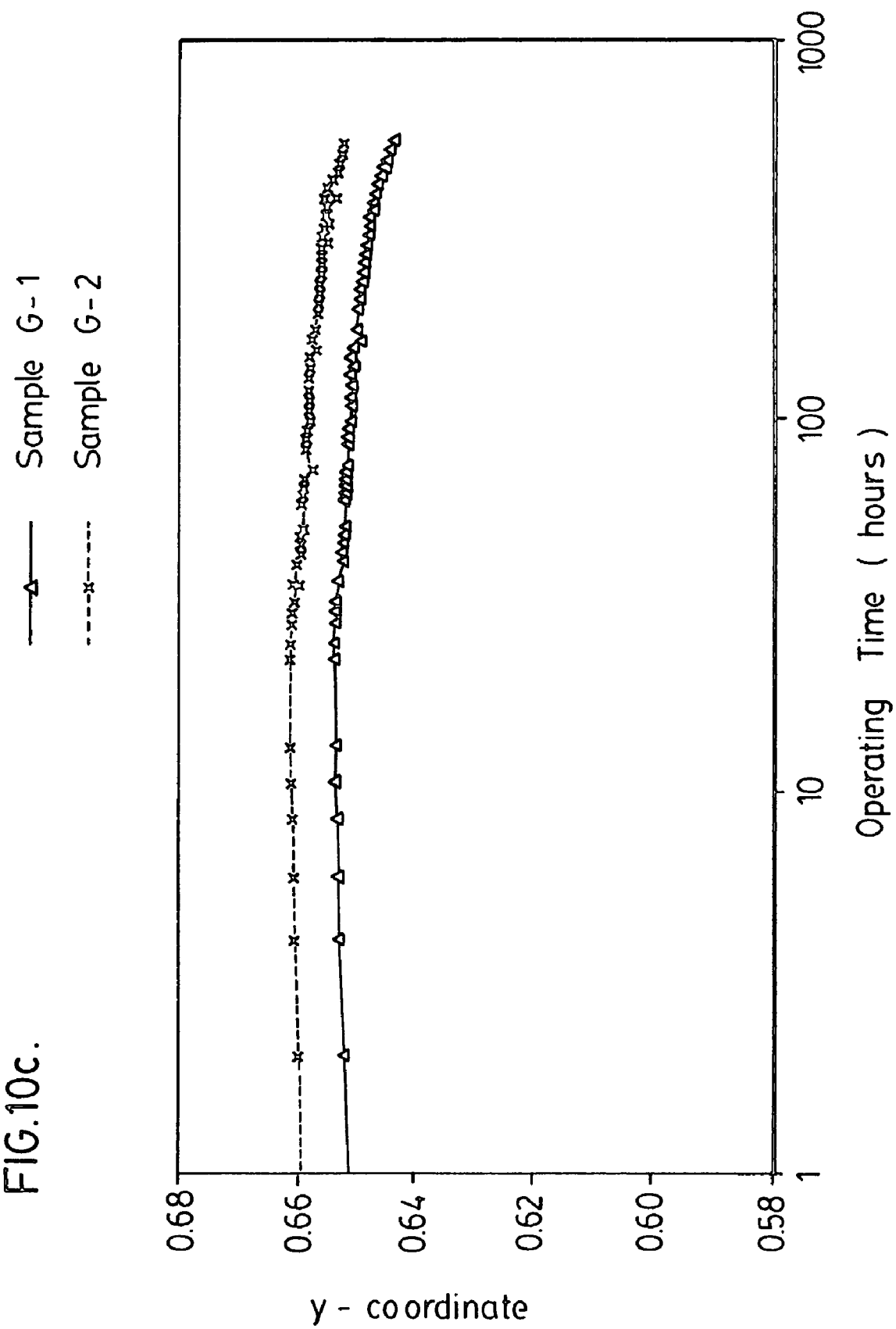

COLOR-CONVERTING PHOTOLUMINESCENT FILM

This application claims the priority benefit of U.S. application Ser. No. 60/571,941, filed May 18, 2004, the disclosure of which is incorporated herein by reference.

FIELD OF INVENTION

The present invention relates to a color electroluminescent display. More specifically, the present invention relates to an improved color-converting photoluminescent film that provides visible light emission in the red to green portion of the visible spectrum when excited by blue light. The color-converted photoluminescent films of the invention are patternable and have improved luminous efficiency and stability and are suitable for use in electroluminescent displays.

BACKGROUND TO THE INVENTION

Thick film dielectric structures as exemplified by U.S. Pat. No. 5,432,015 (the entirety of which is incorporated herein by reference) are typically fabricated on ceramic or glass substrates and provide superior resistance to dielectric breakdown, as well as a reduced operating voltage compared to thin film electroluminescent (TFEL) displays fabricated on glass substrates. Traditionally three phosphor materials, red, green and blue phosphors, are coated and patterned on top of thick dielectric structure to generate red, green and blue light. However this triple patterning method has several disadvantages such as difficulty in matching turn-on luminance-voltage characteristics, requirement of near perfect uniformity of all three phosphors to match color balance, low yield, long cycle time and high cost of equipment.

Color organic light emitting diode (OLED) displays are known and described, for example in: T. Shimoda et al., Society for Information Display 99 Digest, pp 376-80; U.S. Pat. App. Pub. No. 2002/0043926; C. Hosokawa et al, Society for Information Display 97 Digest pp 1073-6; and U.S. Pat. No. 6,608,439. In particular, U.S. Pat. No. 6,608,439 describes an OLED incorporating semiconductor nanocrystal layers to produce different colors. However, OLEDs cannot be used to build a passive matrix large area display having several pixel rows with any reasonable luminance. This limitation may be mitigated to some extent by using active matrix addressing, but the thin film transistor (TFT) array needed for active matrix addressing is, in itself, difficult to scale up and costly for large area displays with a large number of addressable rows.

U.S. Pat. No. 5,670,839 describes an electroluminescent device that utilizes photoluminescent materials to convert ultraviolet light to visible light. The conversion efficiency for such materials, using ultraviolet excitation, is relatively low. In addition, ultraviolet light tends to degrade the display.

U.S. Pat. No. 5,605,761 describes a homogeneous film comprising a polycarbonate polymeric matrix, dye selected from thioxanthone, perylene imide and thioindigoid compounds and hindered amine light stabilizer (HAL). The film is used to form a fluorescent article which is not degraded by UV light from the ambient environment. U.S. Pat. App. Pub. No. 2003/0015689 describes fine particles of a homogenous material comprising fluorescent coloring matter, a UV absorbent (UVA) and a light stabilizer in a polymer binder. U.S. Pat. App. Pub. No. 2003/0104235 describes stabilizing fluorescent compositions with HALS and UVAs. U.S. Pat. App. Pub. No. 2003/0111641 describes pigments of a homogenous solid material dissolved in a polyamide matrix material containing UVAs and HALS. The compositions comprise dyes dissolved in polyvinyl chloride. None of these aforementioned patents or patent application discloses a stabilized pigment particle composition provided within a photo-patternable resin.

The Applicant's International Patent Application PCT CA03/01567 discloses an electroluminescent display incorporating a blue light-emitting electroluminescent sub-pixel array used in conjunction with color-converting photoluminescent films. In the display, emitted blue light for blue sub-pixels is converted to red light for red sub-pixels and to green light for green sub-pixels. This construction of display overcomes the control difficulties and manufacturing complexities associated with displays constructed according to the prior art. However, it is still necessary to pattern the red and green light-producing photoluminescent films to form the red and green sub-pixel arrays. Further, any differential changes in the efficiency by which these photoluminescent films convert the blue light to red and green light can potentially negatively affect the color balance of the display by causing the luminance of the red and green sub-pixels to decrease at different rates with respect to each other and with respect to the luminance of the blue sub-pixels. The photoluminescent layers are formed by dispersing color-converting fluorescent pigment powder in a UV curable resin which is then screen printed on top of a passivation layer and UV cured. Fluorescent pigments are different from conventional pigments which are organic crystals and which do not fluoresce. The fluorescent pigments absorb high energy photons such as ultraviolet light or short wavelength visible light and emit visible light of lower energy or longer wavelength. Commercially available fluorescent pigments are known to be unstable when they are exposed to sunlight and therefore their light emitting properties, or light-fastness is poor. Where a blue light source is used for excitation of the pigment, it has been found that the available pigments were rendered unstable in the presence of blue light, even in the absence of ultraviolet light. This is partly due to the fact that the absorption of UV light by the fluorescent pigments as provided within polymers can lead to photochemical reactions producing free radicals followed by photo-oxidation.

It is therefore highly desirable to provide an improved color converting photoluminescent film that can be used in an electroluminescent display in a cost effective and operationally effective manner that obviates the shortcomings of the prior art.

SUMMARY OF THE INVENTION

The present invention is an improved color-converting photoluminescent film for use in electroluminescent displays such as for example in thick film dielectric electroluminescent displays. The improved color-converting photoluminescent film comprises fluorescent pigments that have stable red or green photoluminescence in the presence of an excitation source such as high intensity blue light and also in the presence of ambient ultraviolet light. The fluorescent pigments are provided as compositions that incorporate a polymeric material and molecular additives. The composition is provided as particles. The fluorescent pigment particles are then provided within a clear UV curable resin to form a film. The molecular additives function to scavenge and/or inhibitor free radicals generated from the blue or ultraviolet light during the polymerization of the polymeric material or cross-linking of the fluorescent pigment particles within the resin. The molecular additive may be incorporated within the fluorescent pigment composition and/or the UV curable resin. In this manner the color-converting photoluminescent film of the invention has improved luminous efficiency and stability. The efficiency of conversion from blue to red and green is highly stable as are the CIE color coordinates of the emitted red and green light. The film is also patternable for registration over red or green sub-pixels using photolithographic methods.

According to an aspect of the present invention is a stabilized fluorescent pigment particle composition, said composition comprising:

(a) at least one dye;
(b) polymeric material; and
(c) molecular additive;
wherein (a), (b) and (c) are formulated into particles.

According to another aspect of the present invention is a color-converting photoluminescent paste, said paste comprising:

(i) fluorescent pigment particles; and
(ii) a clear UV curable resin comprising photo-initiator that does not substantially absorb blue light, wherein a molecular additive is provided in (i) and/or (ii).

In aspects, the molecular additive is only provided within the fluorescent pigment particles. In other aspects, the molecular additive is only provided within the curable resin. Still in other aspects, the molecular additive is provided both within the fluorescent pigment particles and the curable resin.

According to yet another aspect of the present invention is a color-converting photoluminescent film, said film comprising a mixture of a clear UV curable resin and photo-initiator that does not substantially absorb blue light together with stabilized fluorescent pigment particles, wherein said mixture is deposited onto a substrate to form a film and UV cured. According to still another aspect of the present invention is a color-converting photoluminescent film, said film comprising a mixture of a clear UV curable resin photo-initiator that does not substantially absorb blue light and molecular additives into which fluorescent pigment particles are incorporated, the fluorescent pigment particles comprising at least one dye, a polymeric material and molecular additive, wherein said mixture is deposited onto a substrate to form a film and UV cured In aspects of the invention, the UV cured color-converting photoluminescent film is further thermally cured.

According to still another aspect of the present invention is a color-converting photoluminescent film, said film comprising:

(a) a clear UV curable resin and photo-initiator to which is admixed (b) fluorescent pigment particles comprising at least one dye and a polymeric material, wherein said film is deposited on an electroluminescent panel constructed on a glass, glass ceramic or ceramic substrate and further UV cured and thermally cured.

According to still another aspect of the present invention is a color-converting photoluminescent film deposited onto an electroluminescent panel constructed on a glass, glass ceramic or ceramic substrate, said film comprising:

(a) a clear UV curable resin and photo-initiator that does not substantially absorb blue light to which is admixed (b) fluorescent pigment particles comprising at least one dye and a polymeric material, wherein a molecular additive is provided to (a) and/or (b), wherein said deposited film is UV cured and thermally cured.

In any of the aspects of the invention, the molecular additive may be selected from the group consisting of hindered amine light stabilizers (HALS) and ultraviolet absorbers (UVAs).

A method of improving the efficiency of conversion of blue light to red and blue light to green in an electroluminescent display, said method comprising;

providing a color-converting photoluminescent film that comprises fluorescent pigment particles provided within a UV light cured resin, wherein said fluorescent pigment particles and/or said cured resin contains a molecular additive to scavenge or inhibit free radicals generated by said blue light or UV light.

An electroluminescent display, said display comprising;

a pixel sub-structure comprising sub-pixels, each sub-pixel comprising a blue light emitting electroluminescent inorganic phosphor layer; and a color-converting photoluminescent layer containing a molecular additive therein, wherein said photoluminescent layer is associated with said sub-pixels such that the blue light emitted by a sub-pixel is absorbed by said photoluminescent layer to emit a red or green light.

According to another aspect of the present invention is a method for patterning a deposited photoluminescent film, said method comprising:

depositing a film of any one of claim 1 to 17 onto a substrate;

exposing said deposited film to UV light through a photomask to harden portions of said film that are to remain on the substrate; and dissolving away portions of said film not exposed to said UV light leaving only portions exposed to UV light.

In aspects of the invention, the photo-initiator present in the film helps in the process of patterning of the film in an efficient manner.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from the detailed description.

BRIEF DESCRIPTION OF THE DRAWINGS

A preferred embodiment of the present invention will now be described more fully with reference to the accompanying drawings:

FIGS. 6a, 6b and 6c show the effect of photo-initiators on the luminance and color stability of red light-emitting color-conversion films;

FIGS. 10a, 10b and 10c show the dependence of the luminance and changes in the CIE x and y coordinates from initial values for green light-emitting colour conversion films measured as a function of time of exposure to blue light from an electroluminescent device with an europium activated barium thioaluminate phosphor film.

DETAILED DESCRIPTION OF THE INVENTION

Figure 1:
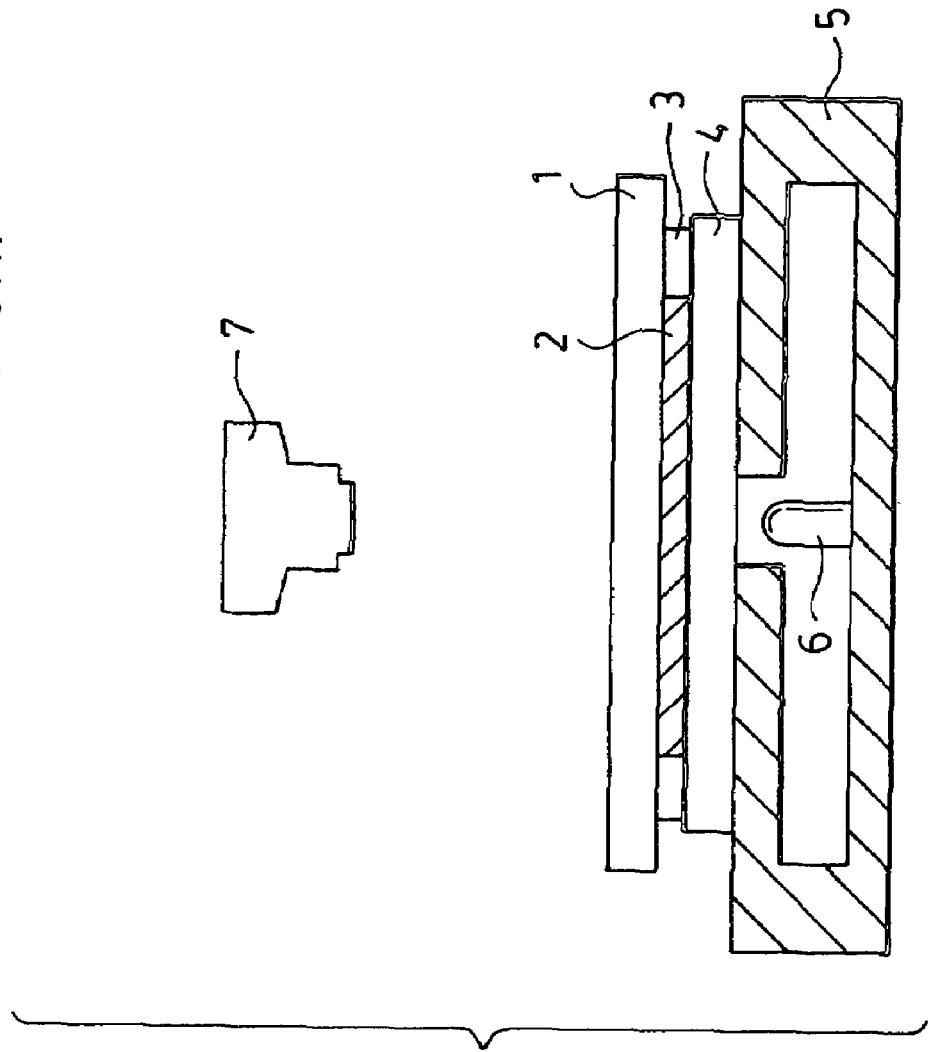
FIG. 1 shows a test arrangement for measuring the photoluminescence from color conversion layers using a blue LED as a light source.

The present invention is an improved color-converting photoluminescent film for use in electroluminescent displays. The improved color-converting photoluminescent film has a molecular additive incorporated therein. The improved film comprises a fluorescent pigment particle composition in which in one aspect of the invention, molecular additives are incorporated therein. The fluorescent pigment particles are then dispersed in a UV curable resin to form a paste which is deposited by screen printing or another suitable method onto an electroluminescent panel constructed on a glass, glass ceramic or ceramic substrate to form a color conversion photoluminescent film. The film is then UV cured and in aspects of the invention the film is further thermally cured. In other aspects of the invention, the molecular additives are added to the UV curable resin. Still in other aspects, the molecular additives are added to both the fluorescent pigment particles and to the UV curable resin.

The dyes within the fluorescent pigment particles absorb blue light from the electroluminescent pixel array and convert it to a longer wavelength light, i.e. red and green respectively. Fluorescence occurs when a photon excites electrons in the pigment to a higher energy level and the excited electrons return to their ground or equilibrium state, thereby emitting light. The molecular additives act to help to scavenge and/or inhibit free radicals generated from the blue light or UV light. This stabilizes and improves the luminance and CIE color coordinates of the color-converting film.

The fluorescent pigment particle composition is dispersed within an UV curable resin. The fluorescent pigment particles are made of a composition comprising at least one dye and a polymeric material to which in one aspect of the invention, a molecular additive is further added such as ultraviolet absorbers (UVAs) and light stabilizers such as hindered amine light stabilizers (HALS) and nickel compounds. The UVAs are selected to preferentially absorb ultraviolet light without hindering the ability of the photoinitiators used in the resin to be activated with UV light and to minimize the absorption of blue light. The fluorescent pigment particles are then mixed and dispersed throughout a clear UV curable resin, such as an acrylated melamine resin that comprises a photo-initiator to form a paste to effect patterning thereof.

This paste is then deposited onto an electroluminescent panel provided on a glass, glass ceramic or ceramic substrate. The paste can be deposited by a variety of methods known to those of skill in the art including but not limited to screen printing, stenciling and roll coating. The deposited film is then UV cured and in aspects of the invention, may be further thermally. As is stated supra, one or more molecular additives may also be incorporated into the UV curable resin.

The photoinitiator used in the deposited film facilitates patterning of films formed by depositing and curing the paste using photolithographic methods. The patterning process is carried out by exposure of the deposited film to UV light through an appropriate photo-mask to harden those portions of the film that are to remain on the display structure. The portions of film not exposed to the UV light can then be dissolved away, leaving only the portions exposed to UV light. During exposure to UV light the photoinitiator decomposes and free radicals produced as reaction products will be largely consumed in the resin polymerization process that occurs during UV light exposure. As some residual photoinitiator may remain in the film following exposure, it is important that this photoinitiator have minimal deleterious effect on the film when it is exposed to blue light from the electroluminescent panel. Any free radicals produced when the photoinitiator is exposed to blue light from the electroluminescent panel may degrade the luminescent properties of the fluorescent dyes in the pigment particles. Therefore it is desirable to select a photoinitiator that absorbs UV light but does not substantially absorb blue light to avoid producing free radicals during panel operation.

Certain dyes suitable for use in the fluorescent particles of the invention are Rhodamine dyes (known to those of skill in the art to be dyes derived from condensation of phthalic anhydride with m-dialkylaminophenols) which have been known to have low light fastness and be unstable under the exposure of sunlight. However, the encapsulation of the dye within the polymeric material enhances light fastness of the dyes. Examples of such dyes may include but are not limited to those contained in BRILLIANT ORANGE™ (SR Conc. Series), FT ORANGE-RED™ (FT-H series), VS-212 RED™, P7-0R0624™ and MC-OR5864™ all of which are pigments that emit a red colour in response to excitation by blue light. Other suitable red-emitting dyes are perylene dyes. BRIGHT YELLOW™ (SR Conc. Series) pigment from RadoColour Industries is a pigment having a green-emitting dye dispersed in toluene sulphonamide melamine formaldehyde resin. Suitable green-emitting dyes for incorporation into resin materials may be selected from the group consisting of coumarins, naphthalic acid derivatives and quinacridones. The amount of dye for use in the fluorescent particles may be about 1% to about 8% by total weight (and any range therebetween) of the pigment and in aspects may be from about 2% to about 5% by weight of the pigment.

Suitable polymeric materials for use in the making of the fluorescent particles of the invention are modified amino formaldehyde resins which include but are not limited to toluene sulphonamide, melamine formaldehyde resin and benzoguanamine. Also suitable for use as a polymeric material are polyurethanes, polyamides and polyesters. In aspects of the invention, toluene sulphonamide and melamine formaldehyde resins are combined with red and green dyes (RADOCOLOR™ red and green pigments) and used as the pigment particles. Both red and green RADOCOLOR™ pigments may be used with the same toluene sulfonamide melamine formaldehyde resins. BRILLIANT ORANGE™ (SR Conc. Series) is a red-emitting fluorescent pigment and, BRIGHT YELLOW™ (SR Conc. Series) is a green fluorescent pigment.]

While not limiting in any manner, the size of the fluorescent pigment particles of the invention may vary and comprise a size distribution such that the median particle diameter (d50) is greater than about 2.5 micrometers. The d50 in aspects of the invention should be less than about 50% of the thickness of the color converting photoluminescent film thickness which is about 10 to about 100 micrometers (and any range therebetween) and in aspects about 25 to about 60 micrometers and in further aspects about 20 to about 50 micrometers. Particle size distribution can readily be assessed using a MICROTRAC X100™ particle size analyzer as is understood by one of skill in the art.

The fluorescent pigment particles are admixed in a clear UV curable resin. For red pigments the loading range of particles in the resin is about 20% to about 60% by weight of the resin. For green pigments, the loading range is about 10% to about 50% by weight of the resin. It is understood by those of skill in the art that the loading ranges may include any possible sub-ranges of these values. In some aspects, the loading range for red pigments is about 30% to about 45% by weight of the resin and for green pigments is about 20% to about 40% by weight of the resin.

As described herein, suitable molecular additives for use in the present invention are light stabilizers such as hindered amine light stabilizers (HALS) and nickel compounds and ultraviolet absorbers (UVAs). Suitable HALS and UVAs for use in the present invention may include but is not limited to one or more of the following:

| Additive's name | type | state |
| --- | --- | --- |
| Ciba ® TINUVIN ® 111 | HALS | chips |
| Ciba ® TINUVIN ® 123 | HALS | liquid |
| Ciba ® TINUVIN ® 292 | HALS | liquid |
| Ciba ® TINUVIN ® 292 HP | HALS | liquid |
| Ciba ® CHIMASSORB ® 119 | HALS | solid |
| Ciba ® TINUVIN ® 144 | blend of HALS & antioxidant | |
| Ciba ® TINUVIN ® 400 | UVA | liquid |
| Ciba ® TINUVIN ® 99 | UVA | liquid |
| Ciba ® TINUVIN ® 1130 | UVA | liquid |
| Ciba ® TINUVIN ® 171 | UVA | liquid |
| Ciba ® TINUVIN ® 384-2 | UVA | liquid |
| Ciba ® Tinuvin ® 411L | UVA | liquid |
| Ciba ® TINUVIN ® 5060 | UVA | liquid |
| Ciba ® TINUVIN ® 5151 | UVA | liquid |
| Ciba ® TINUVIN ® 99-2 | UVA | liquid |
| Ciba ® TINUVIN ® 928 light stabilizer | UVA | powder |
| Ciba ® TINUVIN ® 405 | UVA | solid |
| Ciba ® CHIMASSORB ® 81 | UVA | solid |
| Ciba ® TINUVIN ® 900 light stabilizer | UVA | solid |
| Ciba ® TINUVIN ® 5050 | UVA | |
| Ciba ® TINUVIN ® R796 | UVA | |

Tinuvin 111. Dimethyl succinate polymer with 4-hydroxy-2,2,6,6,-tetramethyl-1-piperidineethanol and N,N'''-[1,2-ethanediylbis[[[4.6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl)-1,3,5-Triazine-2,4,6-triamine]

Tinuvin 123=bis-(1-Octyloxy-2,2,6,6,tetramethyl-4-piperidinyl) sebacate

Tinuvin 292=Bis(1,2,2,6,6-pentamethyl-4-piperidyl) sebacate and Methyl 1,2,2,6,6-pentamethyl-4-piperidyl sebacate Tinuvin 292 HP=Bis(1,2,2,6,6-pentamethyl-4-piperidyl) sebacate and Methyl 1,2,2,6,6-pentamethyl-4-piperidyl sebacate Tinuvin 144=Bis (1,2,2,6,6-pentamethyl-4-piperidinyl)-[[3,5-bis(1,1-dimethylethyl)-4-hydroxyphenyl]methyl]butylmalonate Chimassorb 119=N,N''''-[1,2-ethanediylbis[[[4.6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl)-1,3,5-Triazine-2,4,6-triamine]

Tinuvin 400=2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine Tinuvin 99=3-(2H-benzotriazol-2-yl)-5-(1,1-dimethylethyl)-4-hydroxy-benzenepropanoic acid, C7-9-branched and linear alkyl esters Tinuvin 1130=beta-[3-(2-H-Benzotriazole-2-yl)-4-hydroxy-5-tert.butylphenyl]-propionic acidpoly(ethylene glycol) 300-ester and Bis{b-[3-(2-H-Benzotriazole-2-yl)-4-hydroxy-5-tert.butylphenyl]-propionic acid}-poly(ethylene glycol) 300-ester Tinuvin 171=2-(2H-benzotriazol-2-yl)-6-dodecyl-4-methylphenol, branched and linear Tinuvin 384-2=95% 3-(2H-benzotriazol-2-yl)-5-(1,1-dimethylethyl)-4-hydroxy-benzenepropanoic acid, C7-9-branched and linear alkyl esters and 5% 1-methoxy-2-propyl acetate Tinuvin 411L=hydroxyphenyl-triazine—exact chemical composition is proprietary Tinuvin 5060=1:1 benzotriazole and hindered amine light stabilizer blend—exact chemical composition is proprietary Tinuvin 5151=2:1 benzotriazole and hindered amine light stabilizer blend—exact chemical composition is proprietary Tinuvin 99-2=3-(2H-benzotriazol-2-yl)-5-(1,1-dimethylethyl)-4-hydroxy-benzenepropanoic acid, C7-9-branched and linear alkyl esters Tinuvin 928=2-(2H-Benzotriazol-2-yl)-6-(1-methyl-1-phenylethyl)-4-(1,1,3,3-tetramethylbutyl)phenol Tinuvin 405=2-[4-[(2-Hydroxy-3-(2'-ethyl)hexyl)oxy]-2-hydroxyphenyl]-4,6-bis(2,4-dimethylphenyl)-1,3,5-triazine Tinuvin 900=2-(2H-benzotriazol-2-yl)-4,6-bis(1-methyl-1-phenylethyl)phenol Tinuvin 5050=1:1 benzotriazole and hindered amine light stabilizer blend—exact chemical composition is proprietary Chimassorb 81=2-hydroxy-4-(octyloxy)-phenyl methanone Still other suitable hindered amine-type light stabilizers for use in the present invention may include but not be limited to for example, bis(2,2,6,6-tetramethyl-4-piperidyl) sebacate, dimethyl succinate-1-(2-hydroxyethyl)-4-hydroxy-2,2,6,6-tetramethylpiperidine polycondensate, poly[6-(1,1,3,3-tetramethylbutyl)imino-1,3,5-triazine-2,4-1-diyl][(2,2,6,6-tetramethyl-4-piperidyl)imino]hexamethylene[2,2,6,6-tetramethyl-4-piperidyl)imide], tetrakis(2,2,6,6-tetramethyl-4-piperidyl) 1,2,3,4-butane-tetracarboxylate, 2,2,6,6-tetramethyl-4-piperidyl benzoate, bis-(1,2,6,6-pentamethyl-4-piperidyl) 2-(3,5-di-t-butyl-4-hydro-xybenzyl)-2-n-butyl malonate, bis-(N-methyl-2,2,6,6-tetramethyl-4-piperidy-l)

sebacate, 1,1'-(1,2-ethanediyl)bis(3,3,5,5-tetramethylpiperazinone), (mixed 2,2,6,6-tetramethyl-4-piperidyl/tridecyl) 1,2,3,4-butane-tetracarb-oxylate, (mixed 1,2,2,6,6-pentamethyl-4-piperidyl/tridecyl) 1,2,3,4-butane-tetracarboxylate, mixed [2,2,6,6-tetramethyl-4-piperidyl/.-beta.,.beta.,.beta.',.beta.'-tetramethyl-3,9-[2,4,8,10-tetroxaspiro(5,5) un-decane]diethyl]1,2,3,4-butane-tetracarboxylate, mixed [1,2,2,6,6-pentamethyl-4-piperidyl/.beta.,.beta.,.beta.',.beta.'-tetramet-hyl-3,9-[2,4,8,10-tetroxaspiro(5,5)undecane] diethyl]1,2,3,4-butane-tetraca-rboxylate, N,N'-bis(3-aminopropyl)ethylenediamine-2,4-bis[N-butyl-N-(1,2,2-,6,6-pentamethyl-4-piperidyl)amino]-6-chloro-1,3,5-triazine condensate, poly[6-N-morpholyl-1,3,5-triazine-2,4-diyl][(2,2,6,6-tetramethyl-4-piperidyl)imino]hexamethylene[(2,2,6,6-tetramethyl-4-piperidyl)imide], N,N'-bis(2,2,6,6-tetramethyl-r-piperidyl)hexamethylenediamine/1,2-dibromo-ethane condensate, [N-(2,2,6,6-tetramethyl-4-piperidyl)-2-methyl-2-(2,2,6,-6-tetramethyl-4-piperidyl)imino] propionamide, etc.

Suitable nickel compounds for use in the invention serving as a light stabilizer are nickel bis(octylphenyl)sulfide, [2,2'-thiobis(4-tert-octylphenolato)]-n-b-utylamine nickel, nickel dibutyldithiocarbamate, nickel complex-3,5-di-tert-butyl-4-hydroxybenzyl phosphate monoethylate, etc. One or more of the UV absorbents and light stabilizers may be used either singly or as mixed.

The amount of light stabilizer such as HALS and nickel compounds for use in the fluorescent pigment particles of the invention is about 0.1% to about 6% by total weight (and any range therebetween) of the pigment particles. In aspects, this range may be about 2% to about 5% by total weight of the pigment particles. The amount of UVAs for use in the fluorescent pigment particles of the invention is about 0.1% to about 5% by total weight (and any range therebetween) of the pigment particles. In aspects, this range may be about 0.5% to about 2% by total weight of the pigment particles. The choice and concentrations of light stabilizers and UVAs provided in the pigment particles can be selected independently from the choice and concentration of light stabilizers and UVAs provided in the UV curable resin.

As provided within the UV resin, the amount of light stabilizer for use may be about 0.1% to about 6% by total weight (and any range therebetween) of the color converting photoluminescent layer. In aspects, this may be about 2% to about 4% by total weight of the color converting photoluminescent layer. The amount of UVAs suitable for use in the UV resin is about 0.1% to about 5% by total weight of the color converting photoluminescent layer. In aspects, this may be about 0.5% to about 1.5% by total weight of the color converting photoluminescent layer.

Stabilization of the color-conversion photoluminescent film provides an increase in the luminance and CIE color coordinates of the film and minimizes loss of luminance and changes in CIE colour coordinates for green and red sub-pixels during operation of an electroluminescent display where such films are provided therein. This is achieved in the present invention by the use of the molecular additives such as HALS, nickel compounds and UVAs. When the color-conversion photoluminescent films are used in electroluminescent devices where the color-conversion layer is exposed to intense blue light as an excitation source during display operation or to UV during a photolithographic process where, the light stabilizers (i.e. HALS or nickel compounds) scavenge free radicals created from the scission of molecular bonds from the absorption of UV or blue light that otherwise readily react with polymers, oligomers and monomers which may be present in the dyes, the polymer incorporating the dyes, or the UV curable resin matrix which may contain additives. The chemical reaction affecting the electronic structure of the dye molecules may reduce or eliminate the generation of fluorescent light and the photon energy may be wasted as the generation of heat, thus degrading the color conversion efficiency of the dyes and changing the color of the red and green light that is emitted. UV absorbers are believed to protect the dyes, polymers and UV curable resin by reducing the intensity of the ultraviolet light to which they are exposed. The stability of color conversion layer is also dependent on the properties of the dyes, encapsulating polymers surrounding the dyes and the UV curable resin in which pigment particles are dispersed.

In an embodiment of the invention where the light stabilizers and UVAs are incorporated into the fluorescent pigment particles, any photochemical reactions from the free radicals formed within pigments may be prevented or minimized. Also UV absorbers within pigment particles may protect the pigment against photochemical degradation and color change.

In a further embodiment of the invention where light stabilizers and UVAs are incorporated into both the fluorescent pigment particles and the UV curable resin, this may add to the effectiveness of these molecular additives in absorbing ultraviolet light and scavenging free radicals created in both fluorescent pigments and UV resin matrix. A suitable but non-limiting example of a hindered amine light stabilizer is CIBA TINUVIN 123® and a suitable but non-limiting example of an ultraviolet light absorber is CIBA TINUVIN 400®.

The color-converting photoluminescent film is provided as a paste which is deposited as a uniform film and then patterned onto an electroluminescent panel using photolithographic methods known in the art. Typically, one color converting photoluminescent layer is used for red and one layer is used for green with the layer composition being different for red and green. It is also within the scope of the invention to use more than one layer stacked on top of one another. For example, to further improve color conversion efficiency from blue to red, a bottom layer may be used to convert blue light to green or yellow and a second layer may be used to convert the green or yellow to red.

The paste is deposited to form a uniform layer of a first color conversion photoluminescent layer (for example green) onto a sub-pixel array using screen printing techniques or other methods as known to those of skill in the art. The sub-pixel array is such as that disclosed in the Applicants PCT Application PCT CA03/01567 (the entirety of which is incorporated herein by reference). The uniform screen printed film is exposed to a UV light through a photomask with the desired pixel pattern to activate the photoinitiator to cure the resin and then dissolve the unexposed portion in a solvent (as described in Applicants PCT Patent Application PCT CA03/01567, the entirety of which is incorporated herein by reference) to establish the desired pattern for the first color conversion photoluminescent layer. This process is then repeated with the second color conversion photoluminescent layer. After UV curing, the layer or layers may be further exposed to a thermal bake to eliminate monomers, residual photo-initiators, oligomers and other volatile species by out-diffusion and evaporation. This may reduce or eliminate the generation of free radicals when the pigment-containing layer is exposed to blue light or ambient UV light. Thermal curing may be done at a temperature range of about 80° C. to about 160° C. (and any range therebetween) for about 2 or more hours.

In embodiments of the invention, the photo-initiator used together with the clear polymeric resin is selected such that any residual quantity of photo-initiator of decomposition products thereof only minimally substantially absorbs blue light but is still able to absorb sufficient UV light to facilitate the photolithographic process. Photo-initiators that absorb blue light may undergo photo-chemical reactions that may generate free radical and affect the environment surrounding the pigment particles and thus the dyes contained within them. The photo-initiator is used in an optimized concentration to facilitate patterning of the color converting photoluminescent film using photolithographic methods and at the same time maximize the initial luminosity of the color conversion materials and minimize the degradation of the luminosity during excitation by blue light. Suitable photoinitiators for use in the invention include but are not limited to CIBA 2022®, IRGACURE 184® (dissolved in DAROCUR 1173 ™) and IRGACURE 907® (dissolved in DAROCUR 1173®). Suitable curable resins for use in the invention are clear and may include for example but not be limited to acrylated melamine, polyesters, polyamides, polyurethanes and polyvinyl chlorides. In aspects of the invention, acrylated melamine is used as the curable resin. The color converting photoluminescent layers of the invention may be provided in any suitable electroluminescent display such as an electroluminescent display incorporated a thick film dielectric layer. In aspects such a thick film dielectric layer is lead magnesium niobate (PMN) deposited on a lower electrode of the display. A smoothing layer of lead zirconate titanate (PZT) is deposited on the thick film dielectric layer. Together, the smoothing layer and the thick film dielectric is referred to as a composite thick film dielectric layer.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Without intending to be limiting in scope, the following examples serve to illustrate various embodiments of the invention.

Example 1

This example serves to illustrate the effect of adding hindered amine light stabilizers (HALS) and ultraviolet absorbers (UVAs) to color conversion photoluminescent films. Four slurry batches for forming color conversion films were made by mixing 37 grams of BRILLIANT ORANGE SR® pigment (Radocolor Industries of Ambala City, Haryana, India) comprising rhodamine dyes dissolved in a polymerized amino-formaldehyde sulphonamide resin, into 59 grams of acrylated melamine based, ultraviolet curable resin and 4 grams of photoinitiator solution comprising approximately equal parts by weight of 2,4,6 trimethyl benzoyl diphenyl phosphine oxide (TPO) obtained from Ciba Specialty Chemicals Corp of Tarrytown, N.Y., U.S.A. dissolved in CIBA IRGACURE 1173®. Various combinations of hindered amine light stabilizer and UV absorbers additives were blended into these batches.

In the first batch 3% of CIBA TINUVIN 123® and 1% of CIBA TINUVIN 400® was added. In the second batch 2% of CIBA TINUVIN 123® and 2% of CIBA TINUVIN 400® was added. In the third batch 4% CIBA TINUVIN 123® was added and in the fourth batch no additives were added in order to serve as a control batch. Each mixture was placed in a cylindrical container and blended for 5 minutes using a conditioning mixer (AR-250™, manufactured by Thinky Corporation of 3-21-5 Sakuma-Cho, Kanda, Chiyoda-Ku, Tokyo, Japan) with a beater turning at 2000 rpm and with its axis of rotation rotating at 800 rpm to ensure homogeneous blending. The container was then sealed and rolled for 20 minutes at 10 rpm. The resulting pigmented resin paste was screen printed to form a layer with a thickness of 35 micrometers onto a 5 centimeter by 5 centimeter alumina substrate and cured with a UV exposure system (OAI™, San Jose, Calif.) using 365 nm radiation from a mercury arc lamp.

With reference to FIG. 1, a device was constructed consisting of the alumina substrate 1 with the color conversion photoluminescent layer 2 deposited over the central part of the substrate and a epoxy sealing bead 3 placed around its perimeter. A cover glass 4 was placed over the substrate to make contact with the sealing bead forming a seal upon curing of the bead to protect the color conversion layer from the ambient atmosphere. The device was placed in a cutout in a substrate holder 5 and directly exposed to a blue LED lamp 6 driven using a pulsed dc voltage with a pulse width of 30 microseconds and a pulse repetition rate of 10 kHz. The LED had an emission peak of 470 nm and a stable luminance of about 80,000 $cd/m^2$. Since the photoluminescent emission from the color conversion layer was too intense to measure directly with a luminance meter, the luminance meter 7 used to make the red luminance measurements was placed behind the substrate and was measured from the rear side of the substrate after it was attenuated through the alumna substrate. This also ensured that no blue luminance from the LED was measured by the luminance meter, since the blue light did not penetrate through the color conversion photoluminescent layer. This measurement method was used as an accelerated test method wherein the optical pulse width corresponds approximately to the pulse with of the excitation blue light from an electroluminescent display, but the average luminance is about 100 times greater than that from the electroluminescence source due to a higher instantaneous luminance value during a voltage pulse and a substantially higher driving voltage pulse repetition rate than is provided in an electroluminescent display.

Figure 2A:
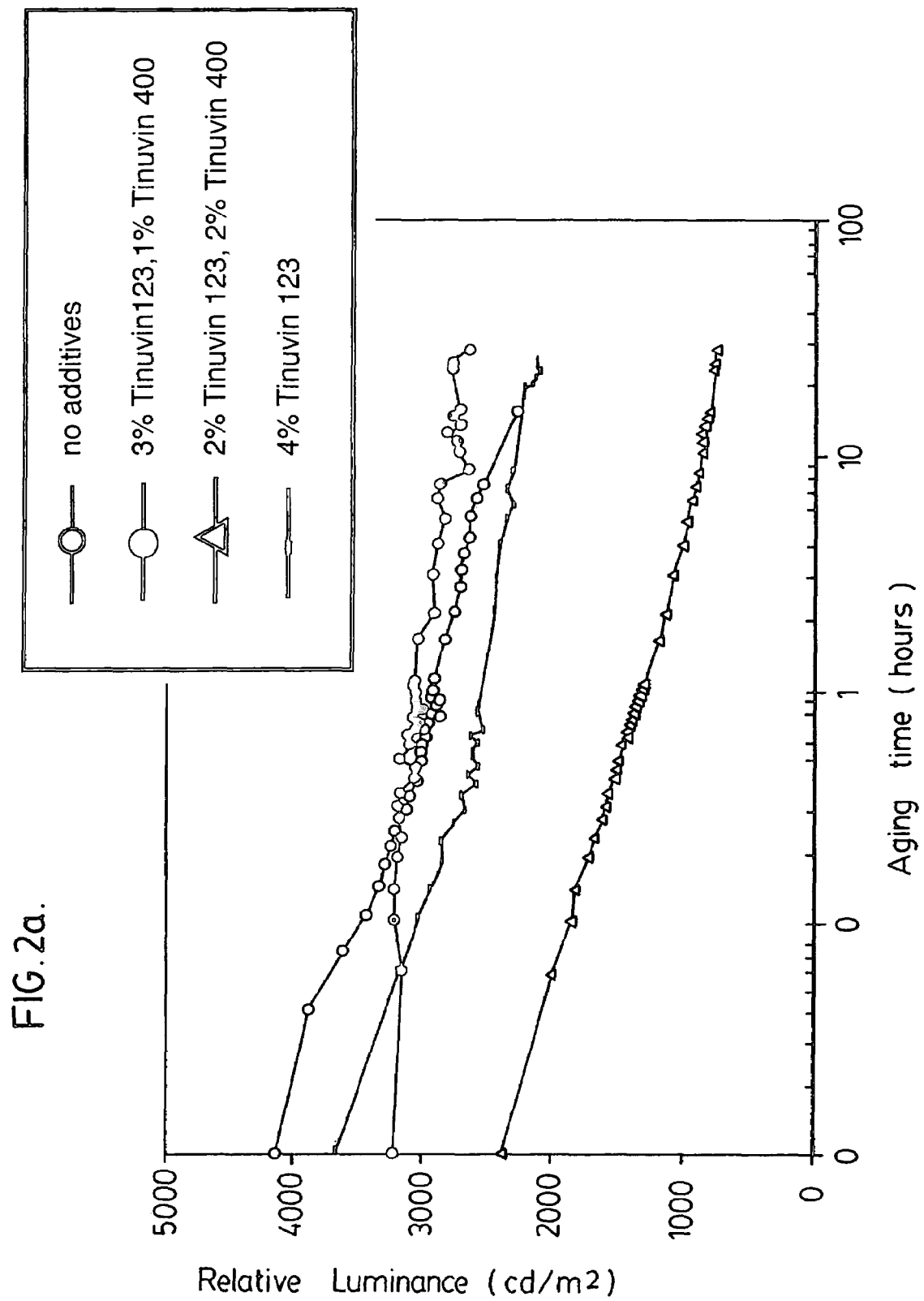
FIGS. 2a, 2b and 2c show the effect of hindered amine light stabilizers (HALS) and UV absorbers (UVA) on the luminance and the x and y CIE coordinates of red light-emitting color conversion films measured as a function of time of exposure to blue light from a light emitting diode.
Figure 2B:
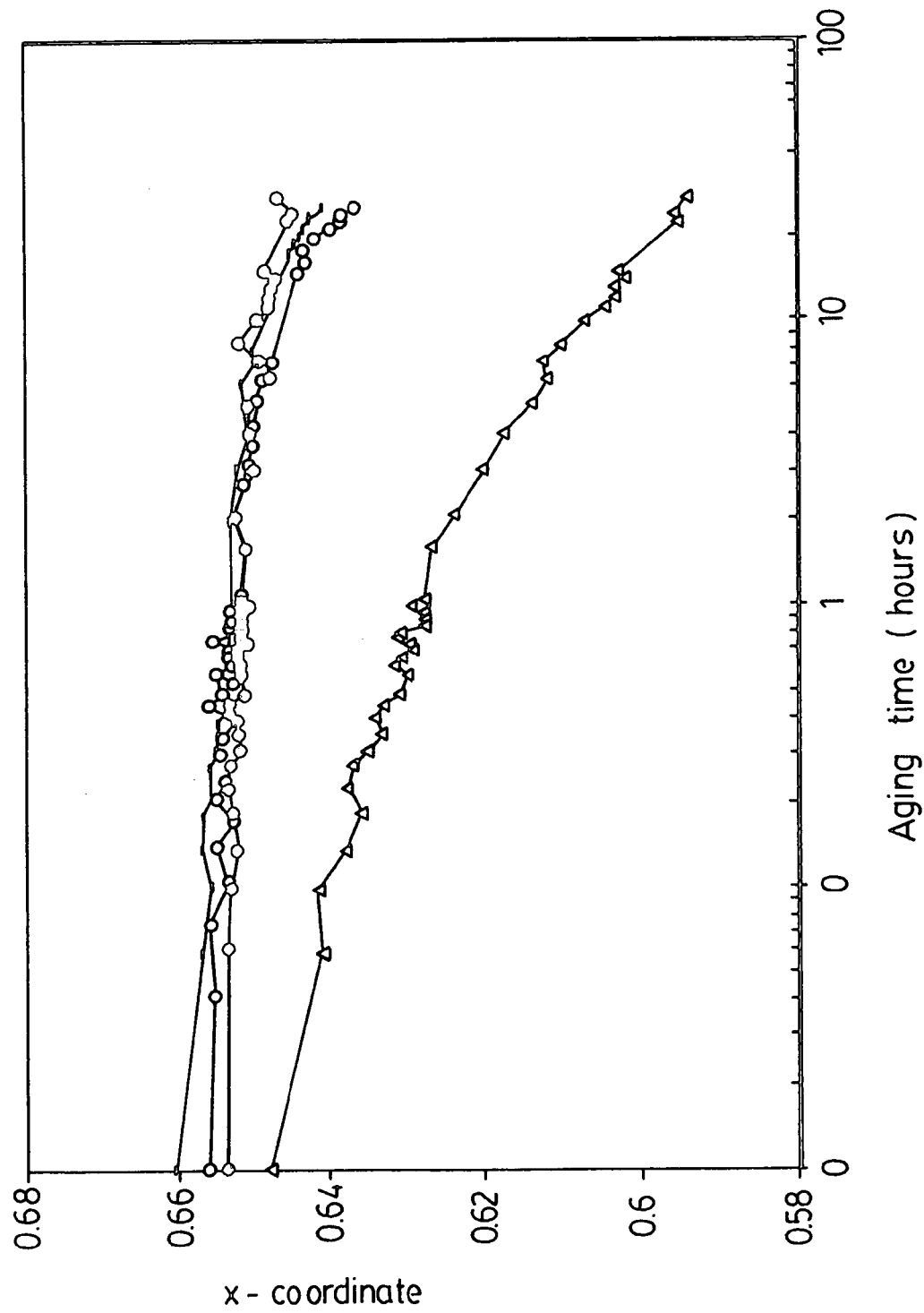
Figure 2C:
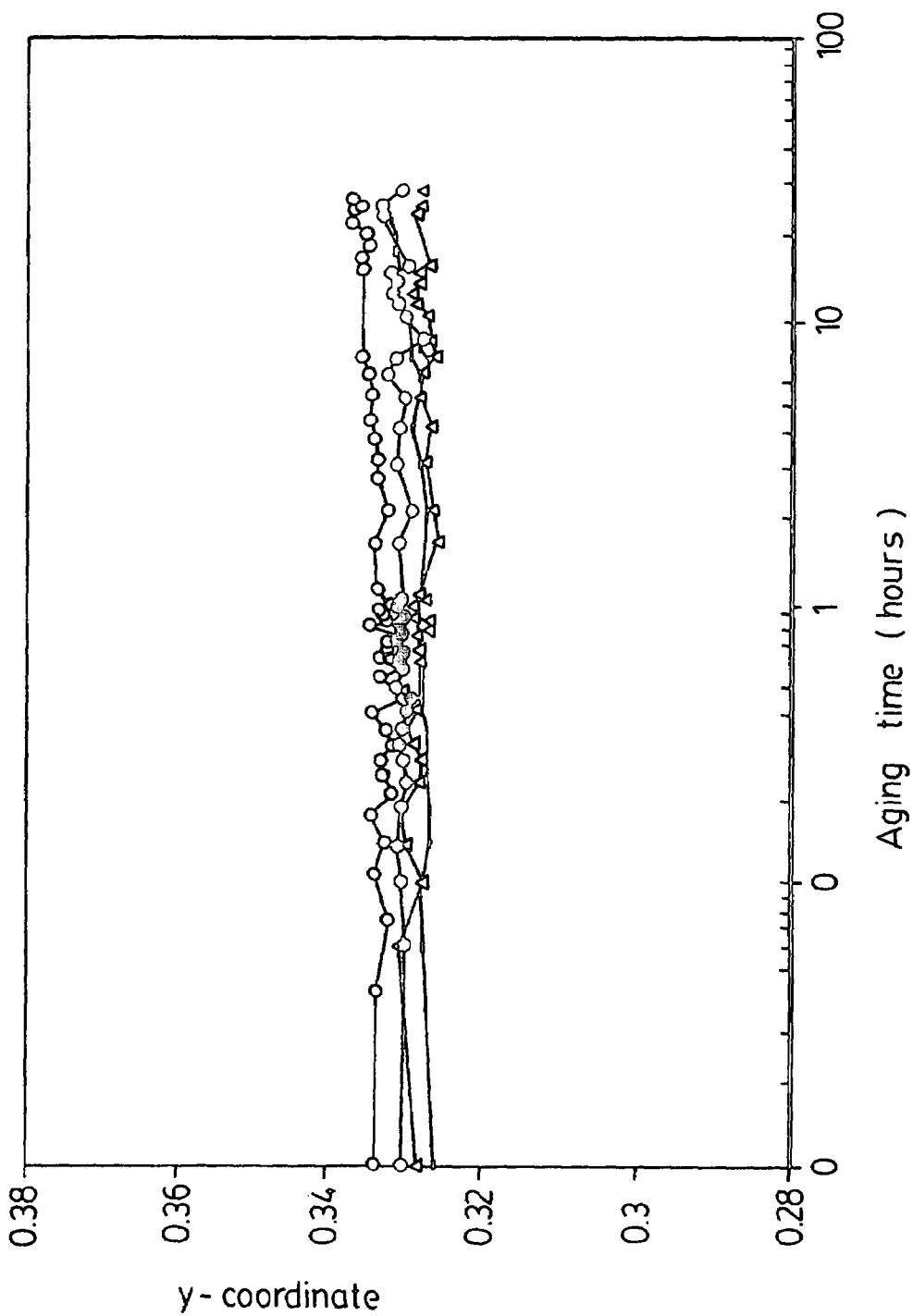
Figure 3:
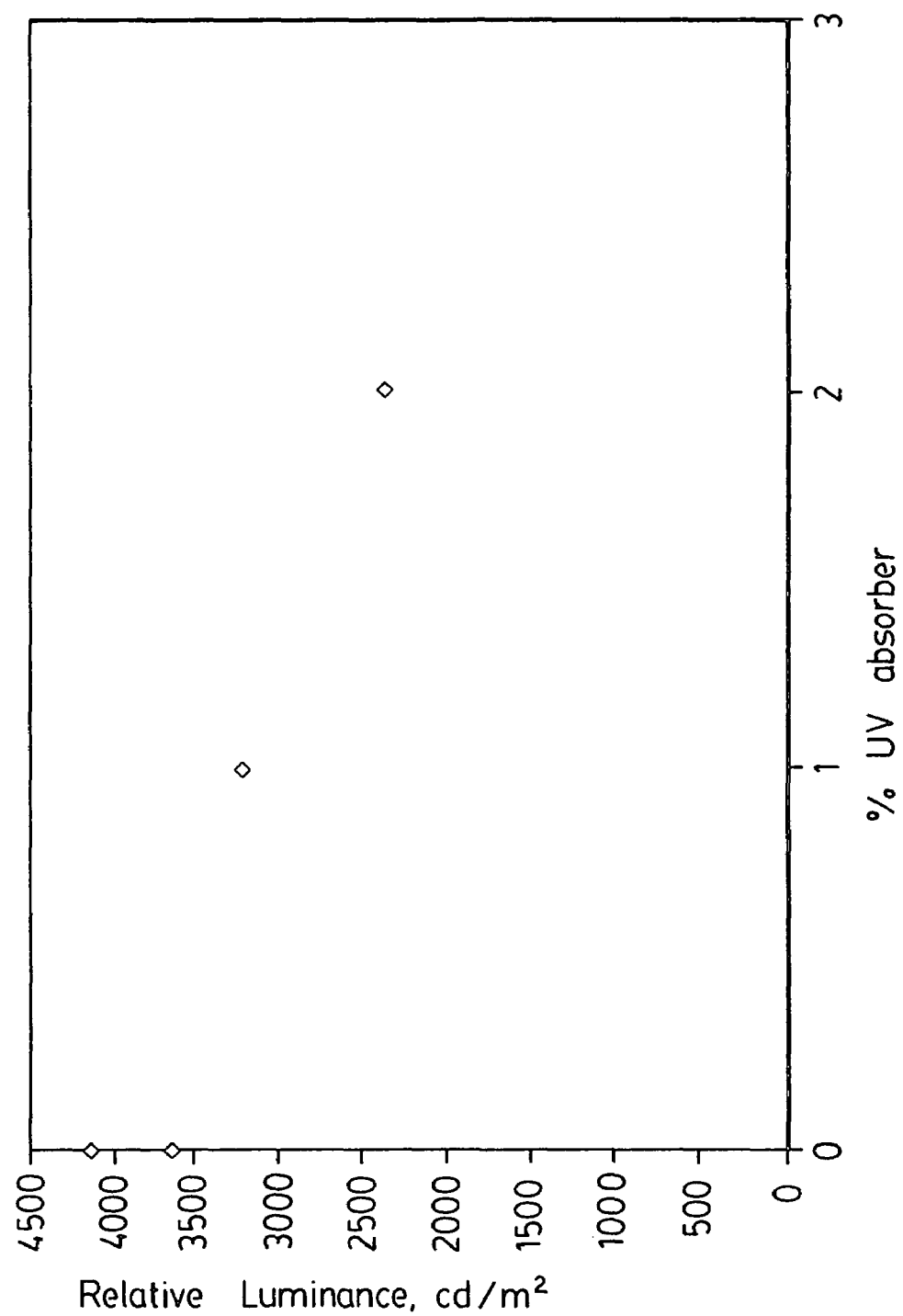
FIG. 3 shows the initial luminance of color conversion films as a function of the concentration of the concentration of UVA added.

The luminance decay and CIE x and y color coordinates of the red photoluminescence generated from the samples as a function of operating time is shown in FIGS. 2a, 2b and 2c. The initial luminance of the samples as a function of the quantity of the UVA CIBA TINUVIN 400® added is shown in FIG. 3. It should be noted that the measured luminance was attenuated substantially by the alumina substrate and that the luminance emitted from the front surface of the color conversion layer was much higher. The luminance data is corrected for variation in the intensity and spectral distribution of the LEDs during the measurements to correspond to a constant radiance from the LED. As can be seen from the data the initial luminance values decreased with increasing UVA concentration, indicating that the UVA was likely absorbing some of the incident blue light from the LED as well. By contrast from FIG. 2a it can be seen that the samples with concentrations of the HALS CIBA TINUVIN 123® that is greater than 2% show less luminance loss with exposure to the blue light from the LED

Example 2

Figure 4:
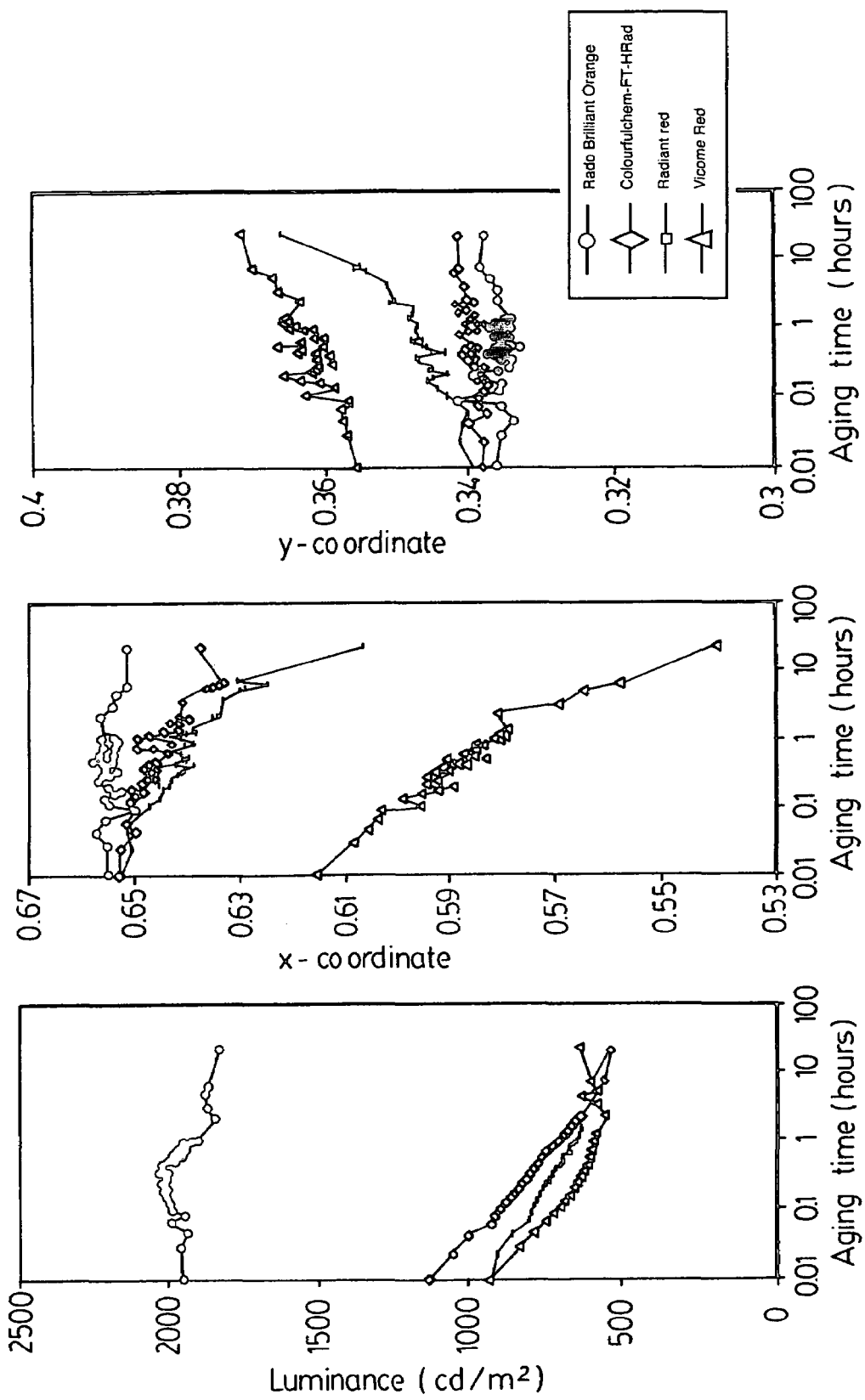
FIGS. 4a, 4b and 4c show the dependence of the luminance and the x and y CIE coordinates of red light-emitting color conversion films measured as a function of time of exposure to blue light from a light emitting diode on the type of pigment used in the film.

This example shows the effect of pigment powder selection on the stability of the color conversion photoluminescent layers. Four slurry batches for forming color conversion photoluminescent films were made by mixing different pigment powders into 59 grams of acrylated melamine based, ultraviolet curable resin and 4 grams of photoinitator solution comprising approximately equal parts by weight of 2,4,6 trimethyl benzoyl diphenyl phosphine oxide (TPO) dissolved in CIBA IRGACURE 1173®. To the first batch 37 grams of BRILLIANT ORANGE SR™ pigment (Radocolor Industries) was added. To the second batch was added 37 grams of FT-H RED™ piment (Colorful Chemical Company of Zhuhai, China). To the third batch was added 37 grams of RED MC-OR™ pigment (Radiantcolor of Richmond, California U.S.A.). To the fourth batch was added 37 grams of VICOME RED™ pigment (Vicome Corp of Yun Lin Hsien, China). Each batch was processed into a color conversion photoluminescent film using the methods described in Example 1. The luminance and CIE color coordinates for the red photoluminescence from each of the samples was measured as a function of time using the method of example 1, except that the measured LED luminance was about 40,000 $cd/m^2$ and is shown in FIGS. 4a, 4b and 4c. From the data it can be seen that the sample containing the RADO BRILLIANT ORANGE™ pigment had the highest luminance and the most stable luminance and CIE color coordinates. The reasons for the superior performance of this pigment is not known, but may be theorized to relate to a relatively large particle size relative to the other pigments or a lower tendency to absorb solvents thus rendering it less susceptible to degradation by reducing the influx by diffusion of the photo-initiator or other constituents of the color conversion photoluminescent film resin into the pigment particles from the resin.

Example 3

Figure 5:
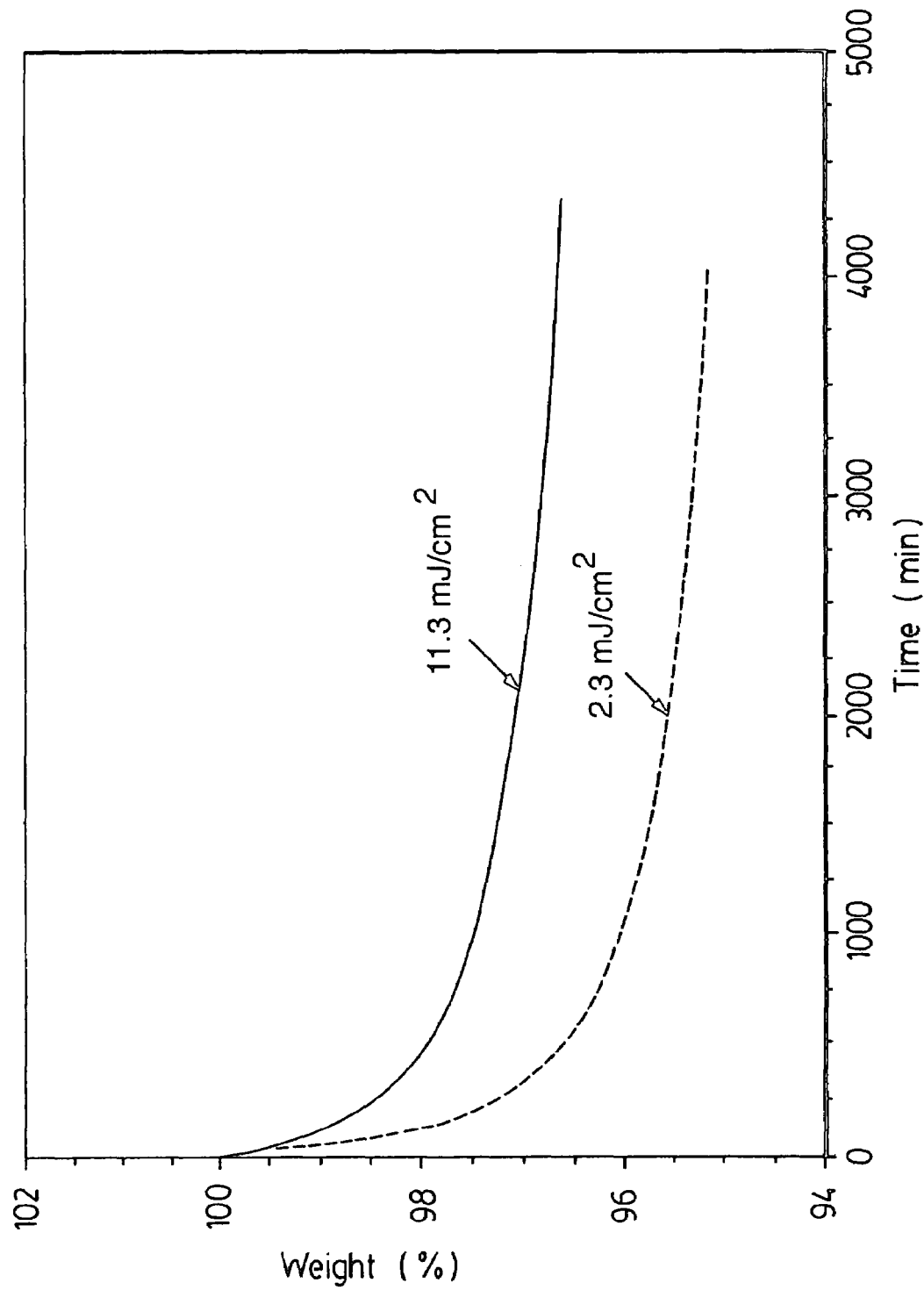
FIG. 5 shows the weight loss of color-conversion films subject to thermal curing following UV curing.

This example illustrates that UV cured acrylated melamine based resins contain a quantity of volatile material that can be removed by subsequent heating. Two samples of UV cured acrylated melamine based resins were put into crucible cups, with a diameter of 4 mm and a volume of 35 microliters for thermogravimetric analysis. One sample was UV cured at 365 nm with a UV dosage of 11.3 $J/cm^2$ and the other sample was cured with a 365 nm UV dosage of 2.3 $J/cm^2$. Each sample was then subjected to a constant temperature of 120° C. over 3 days and its weight was monitored during this period using a thermo gravimetric analyzer (TGA-DTA™ 2960 manufactured by TA Instruments of New Castle, Del., USA). The first sample lost 3.5% of its original weight and the second sample lost 4.9% of its original weight. The weight of the samples as a function of time at 120° C. is shown in FIG. 5. The data shows that volatile components remain in the UV cured samples with the quantity of volatile material being reduced but not eliminated by longer UV exposure time.

Example 4

This example illustrates that thermal curing in addition to UV curing reduces the quantity of volatile material in the acrylated melamine based resin samples. Two samples were prepared consisting of photoluminescent layers deposited on alumina substrates similar to those of example 2. The samples with their deposited layers were cured by exposure to 365 nm radiation from a mercury arc lamp with a total UV dosage of 700 $mJ/cm^2$. One sample was then thermal baked at 120° C. for 5 hours while the other was not subjected to a thermal bake. The samples were then each exposed to a blue LED lamp as in example 1 and the luminance measured as a function of exposure time. The degradation of the red photoluminescence from the samples was monitored as a function of time. The result shows that the sample subject to the thermal bake following UV curing had very little discoloration compared to the sample that was not subject to the thermal bake, which showed darkened red spots indicating the occurrence of photochemical degradation.

Example 5

Figure 6B:
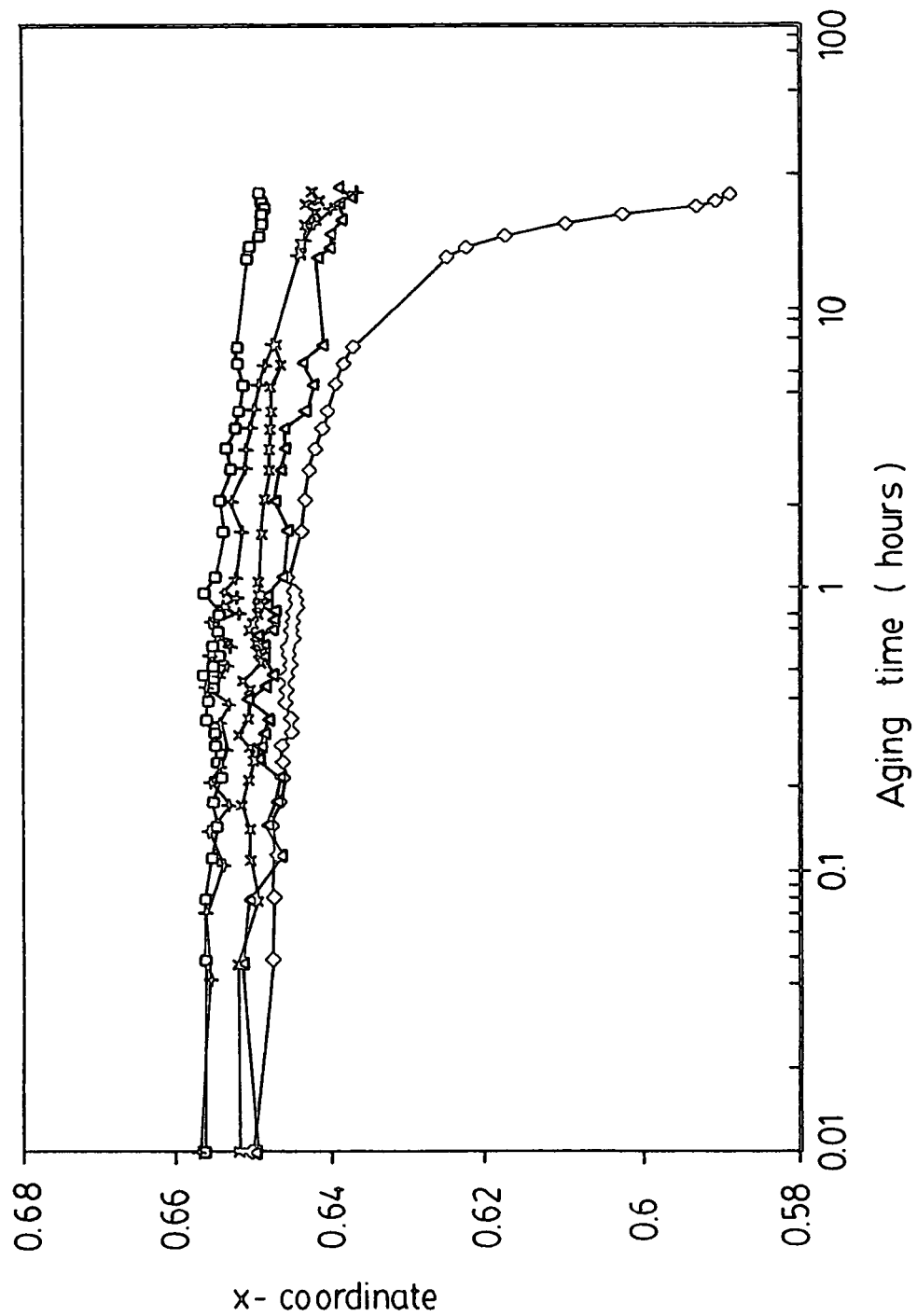
Figure 6C:
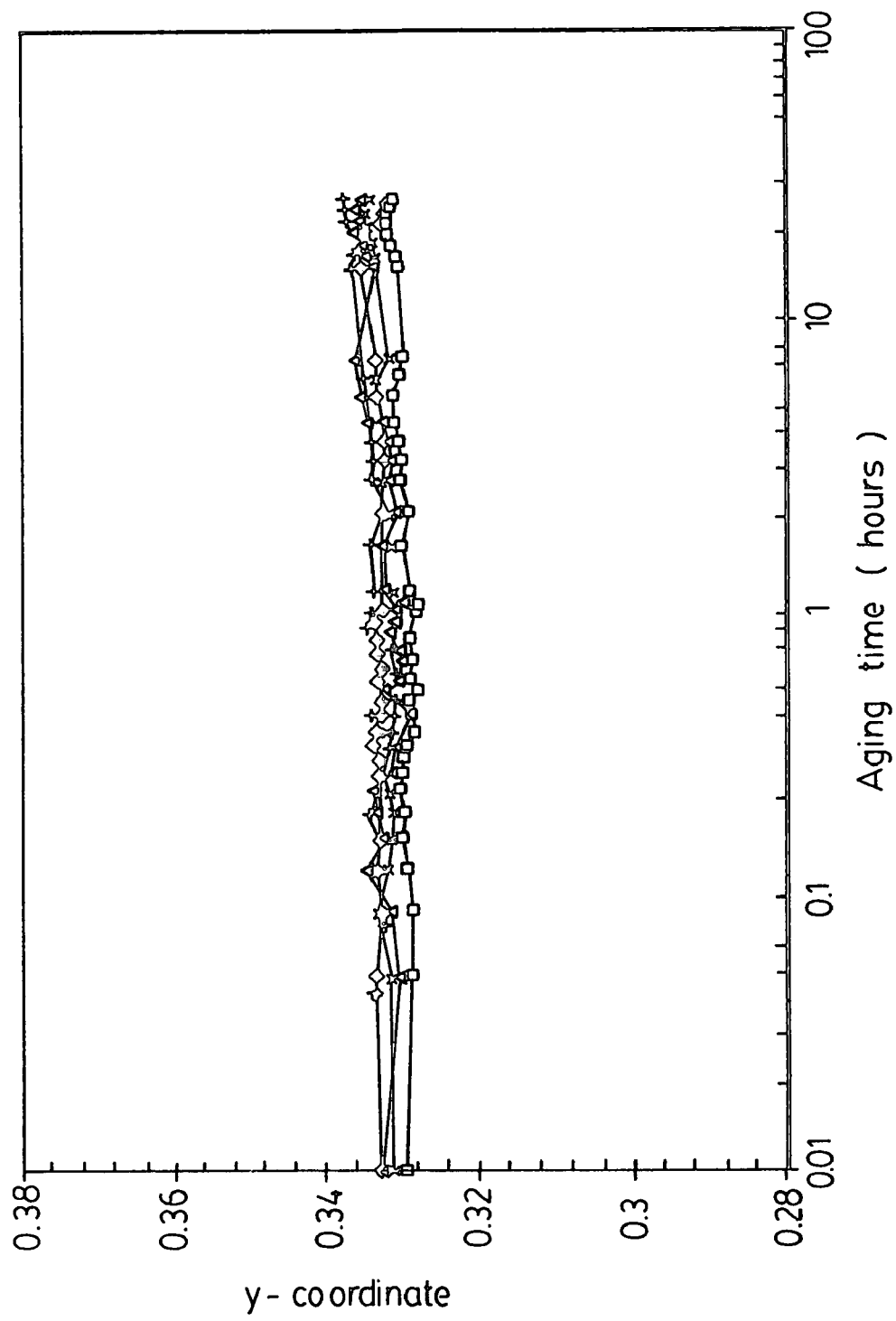
Figure 7:
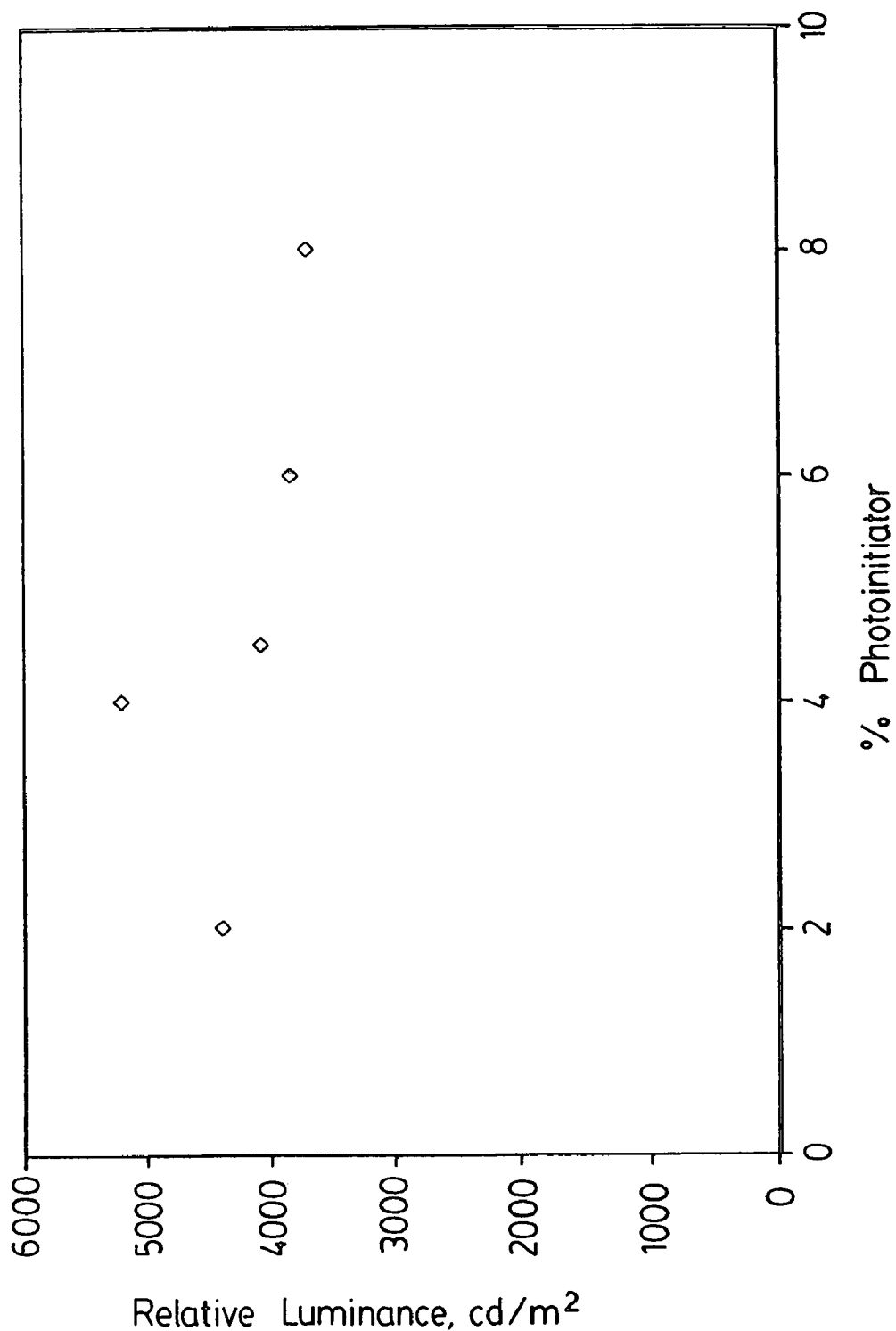
FIG. 7 shows the initial luminance of color conversion films as a function of their photo-initiator concentration.

This example illustrates the effect of different photo-initiator chemicals n the photoluminescent stability of the photoluminescent layers. Five samples were prepared with BRILLIANT ORANGE SR™ pigments of Radocolor. Each was added to an ultraviolet curable, acrylated melamine based resin. In the first sample was also contained 4% photoinitators CIBA IRGACURE 184® dissolved in 4% anisole. The second sample also contained 3% CIBA IRGACURE 184® dissolved in 3% liquid CIBA DAROCUR 1173®. The third sample also contained 2% CIBA IRGACURE 907 ® dissolved in 2% liquid CIBA 1173. The fourth sample also contained 2% CIBA 2022® liquid phosphine oxide and the fifth sample also contained 4.5% CIBA IRGACURE 819®. The percentage of photoinitiator was based on the total weight of pigment and acrylated melamine based resin. Each sample was otherwise prepared using the methods described in example 2. The degradation of the photoluminosity of the samples was measured as a function of time as shown in FIG. 6. The data illustrates that the samples with the photoinitiator CIBA IRGACURE 184® dissolved in liquid CIBA DAROCUR 1173®, CIBA IRGACURE 907® dissolved in liquid CIBA DAROCUR 1173® or CIBA 2022® liquid phosphine oxide had better color stability over the sample with CIBA IRGACURE 819® or CIBA IRGACURE 184® as dissolved in anisole FIG. 7 shows the initial luminosity of the samples as a function of exposure time to the LED. It can be seen that there is a moderate trend to lower luminosity as the photoinitiator concentration is increased, although there is scatter in the data, possibly due to the different photo-initiator formulations used to make each sample.

Example 6

Figure 8:
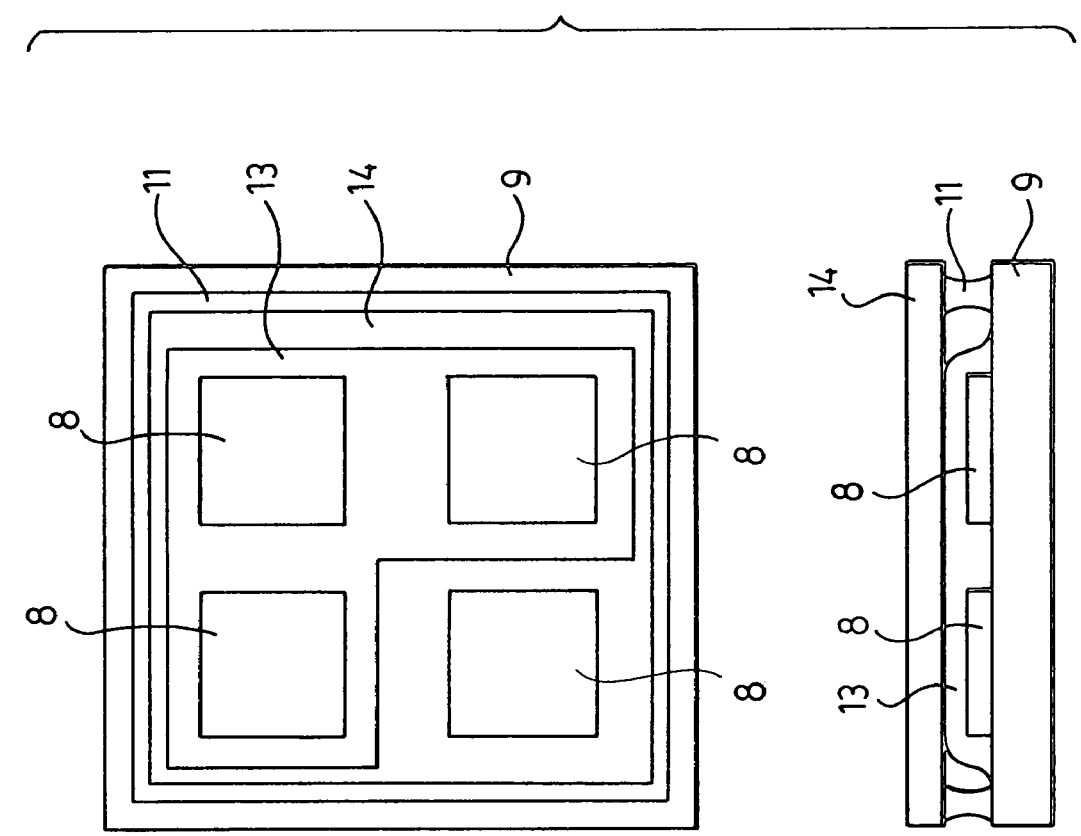
FIG. 8 shows a test arrangement for measuring the photoluminescence from color conversion layers deposited on a blue light from an electroluminescent device.
Figure 9A:
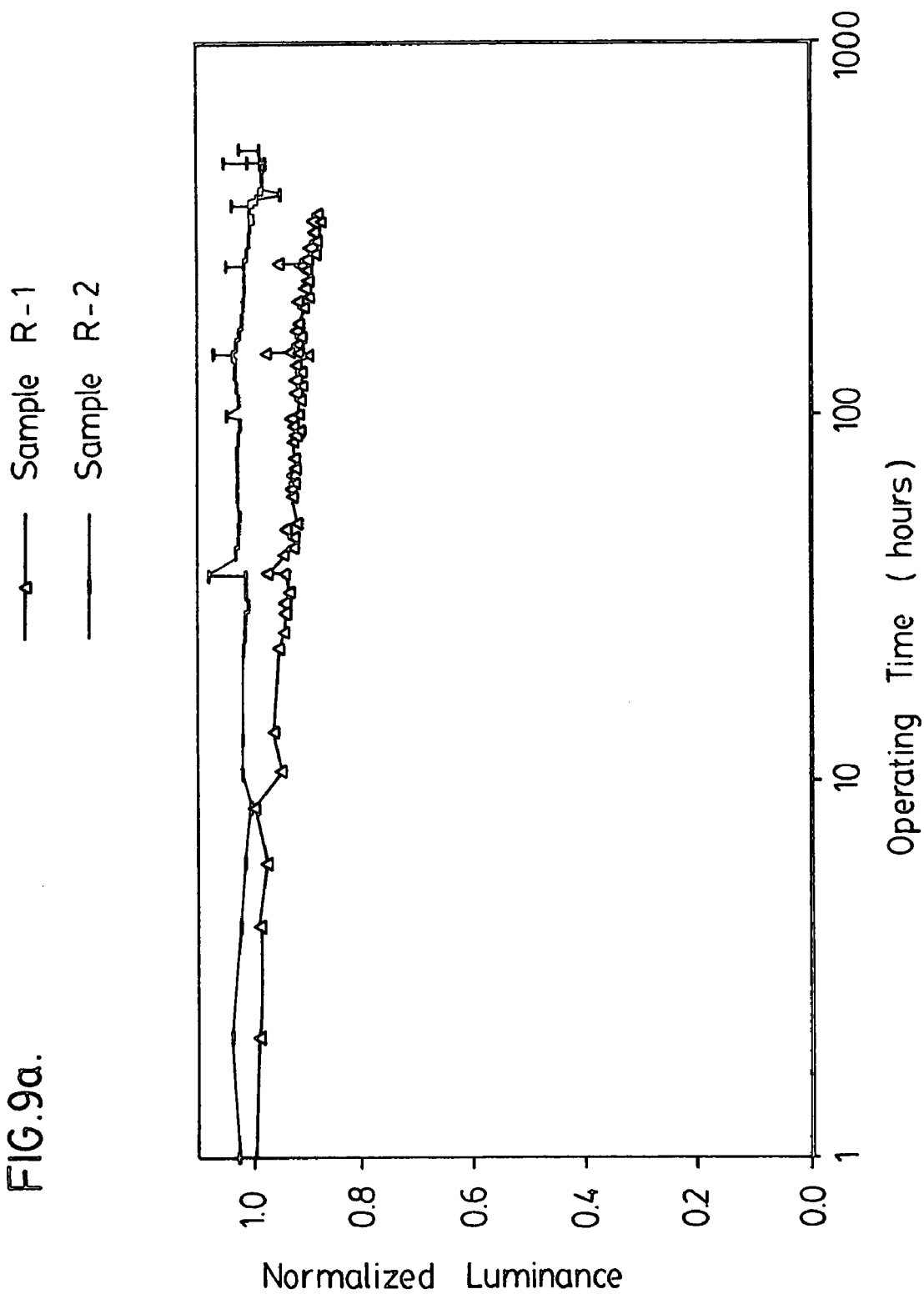
FIGS. 9a, 9b and 9c show the dependence of the luminance and changes in the CIE x and y coordinates from initial values for red light-emitting colour conversion films measured as a function of time of exposure to blue light from an electroluminescent device with an europium activated barium thioaluminate phosphor film.
Figure 9B:
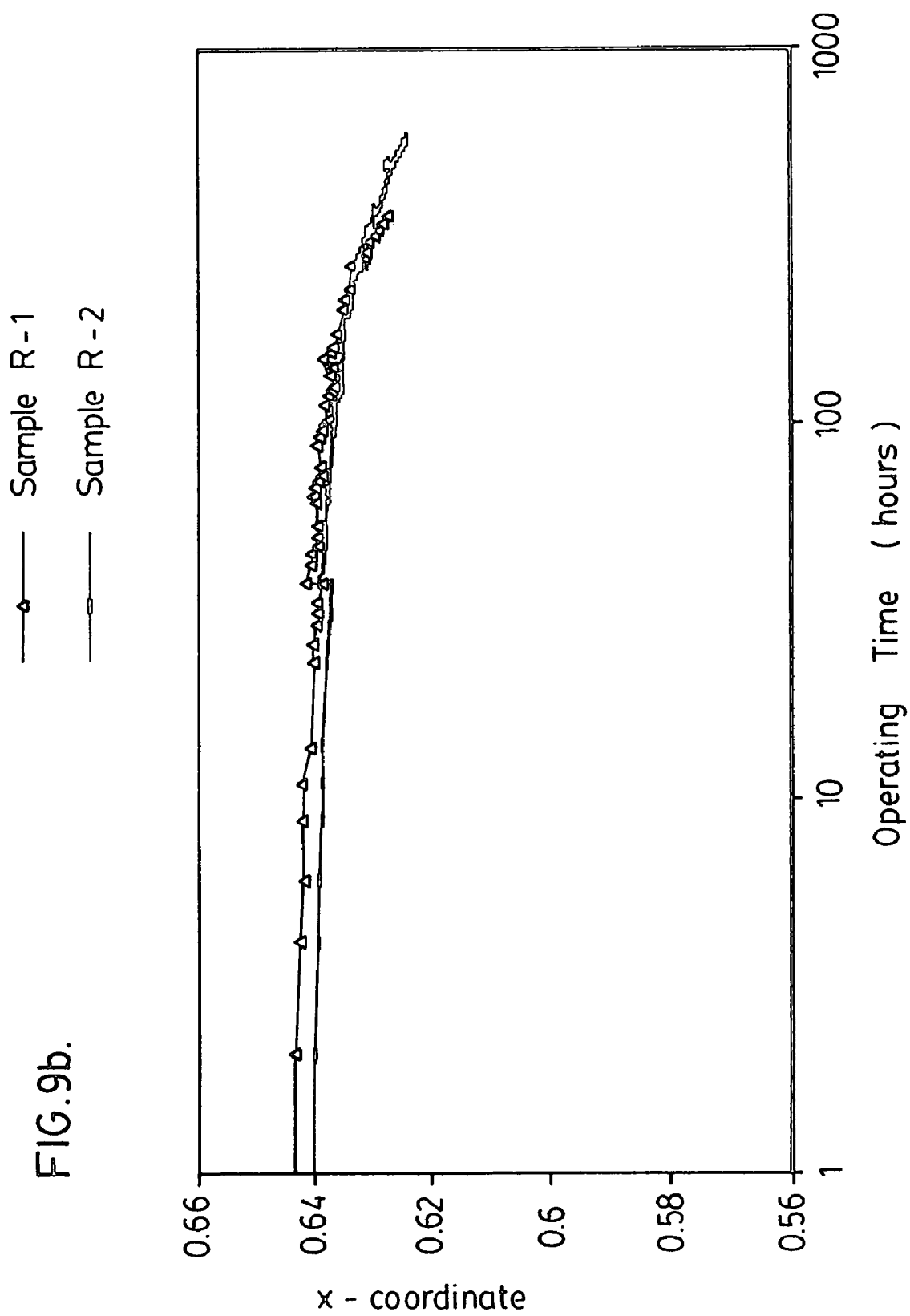
Figure 9C:
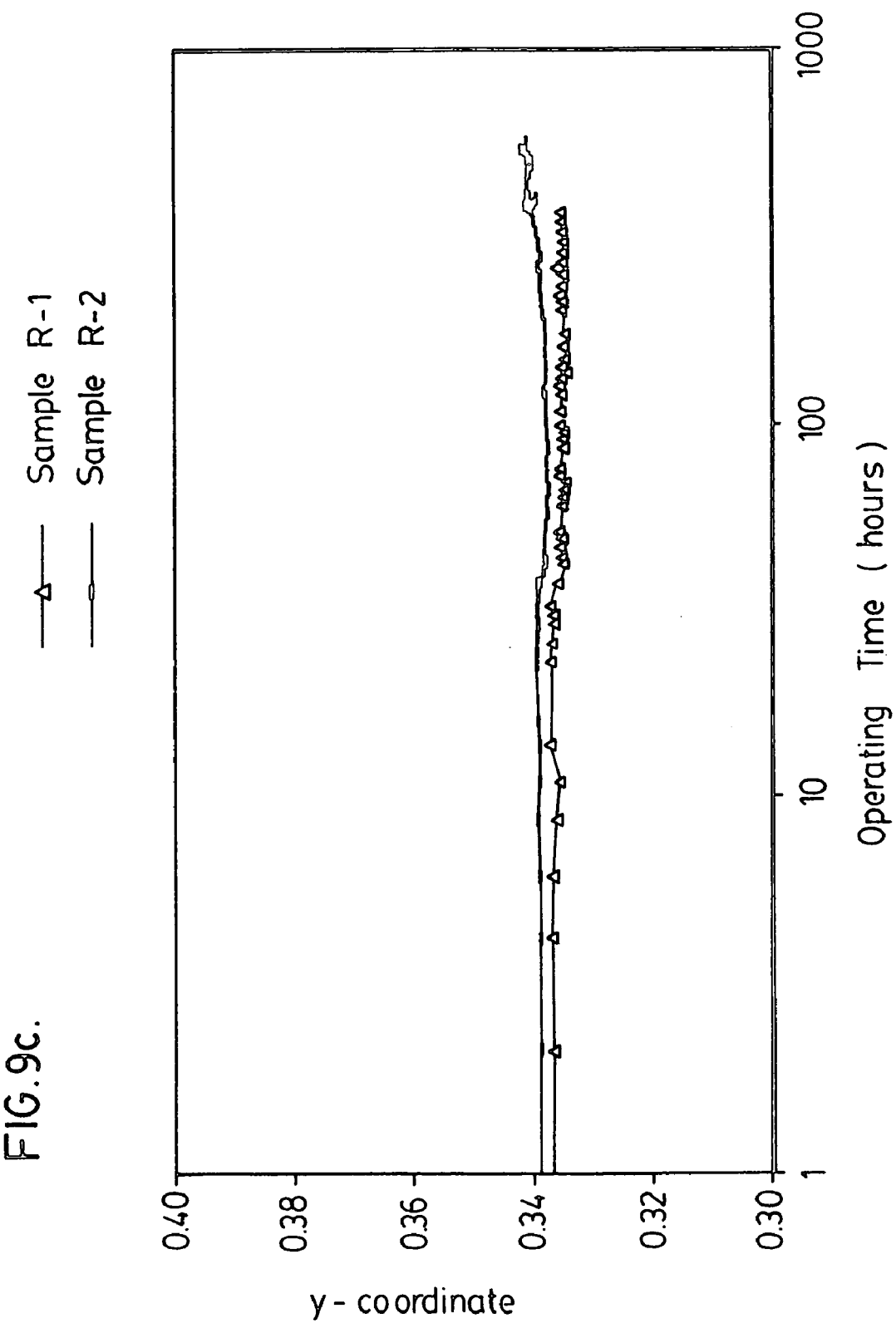

The following example serves to show the stability of red light-emitting colour conversion photoluminescent layers with pigment particles formulated using melamine sulphonamide formaldehyde resins when they are deposited on and illuminated by a blue light from an electroluminescent device. A slurry batch for forming a colour conversion film was made by mixing 39.2 grams of melamine sulphonamide formaldehyde copolymer based resin impregnated with red rhodamine dyes (GT 17 N pigment from Dayglo Color Corp of Cleveland, Ohio, U.S.A.) into 55.6 grams of acrylated melamine based, ultraviolet curable resin and 5.2 grams of photoinitiator consisting of equal parts by weight of 2,4,6 trimethyl benzoyl diphenyl phosphine oxide (TPO) dissolved in IRGACURE 1173®. The mixture was placed in a cylindrical container and blended for 5 minutes using a conditioning mixer (AR-250™, manufactured by Thinky Corporation of Tokyo, Japan) with a beater turning at 2000 rpm and with its axis of rotation rotating at 800 rpm to ensure homogeneous blending. The container was then sealed and rolled for 20 minutes at 10 rpm to form a resin paste. Next, four 5 millimeter by 5 millimeter electroluminescent devices employing a thick dielectric layer and a blue light-emitting europium activated barium thioaluminate phosphor film as taught in U.S. Pat. App. Pub. No. 2004/247858 and U.S. Pat. App. Pub. No. 2004/0179864 (the disclosures of which are incorporated herein in their entirety) that were constructed on a 5 centimeter by 5 centimeter glass substrate. The four devices were covered with a 1.5 to 2 micrometer thick passivation layer consisting of printed and cured CT2000L resin obtained from Fuji Film of Tokyo, Japan. One device was left uncoated to facilitate monitoring of the luminance level of blue light from the devices and the three remaining devices were coated with 30 micrometer thick colour conversion layers by screen printing the prepared resin paste onto the passivation layer. The colour conversion layer was cured with a UV exposure system (OAI™, San Jose, Calif.) using 365 nm radiation from a mercury arc lamp. Next, and with reference to the plan and elevation view in FIG. 8 the devices 8 constructed on the glass substrate 9 as described above were sealed by covering them with a glass plate 14 that was bonded to the substrate using a perimeter sealing bead 11 to protect the devices and the colour conversion layer 13 from the ambient atmosphere. Alternating polarity voltage pulses with a width of about 30 microseconds and a frequency of 240 Hz were applied to the electrodes of the electroluminescent devices with the voltage selected to provide and maintain a luminance level of 400 candelas per square meter from the uncoated pixel. The luminance and CIE x and y coordinates were measured as a function of operating time for both the uncoated device and a coated device. The red luminance from the coated pixel normalized to the initial luminance is shown labeled as sample R-1 in FIG. 9a and the corresponding CIE x and y coordinates also labeled as sample R-1 are shown respectively in FIGS. 9b and 9c.

Example 7

This example serves to show the stability of red light-emitting colour conversion photoluminescent layers with pigments particles formulated using benzoguanamine formaldehyde resins when they are deposited on and illuminated by a blue light from an electroluminescent device. Electroluminescent devices were constructed similar to those of example 6 except that the slurry batch for forming the colour conversion layers was made by mixing 39.2 grams of benzoguanamine formaldehyde based resin impregnated with red rhodamine dyes (MC-OR5864 pigment from Radiant Color, U.S.A.) into 55.6 grams of acrylated melamine based, ultraviolet curable resin and 5.2 grams of the photoinitiator consisting of equal weights of 2,4,6 trimethyl benzoyl diphenyl phosphine oxide (TPO) dissolved in CIBA IRGACURE 1173®. The luminance and CIE x and y coordinates were measured as a function of operating time for both uncoated and coated devices. The red luminance from the coated pixel normalized to the initial luminance is shown labeled as sample R-2 in FIG. 9a and the corresponding CIE x and y coordinates also labeled as sample R-2 are shown respectively in FIGS. 9b and 9c.

Example 8

Figure 10B:
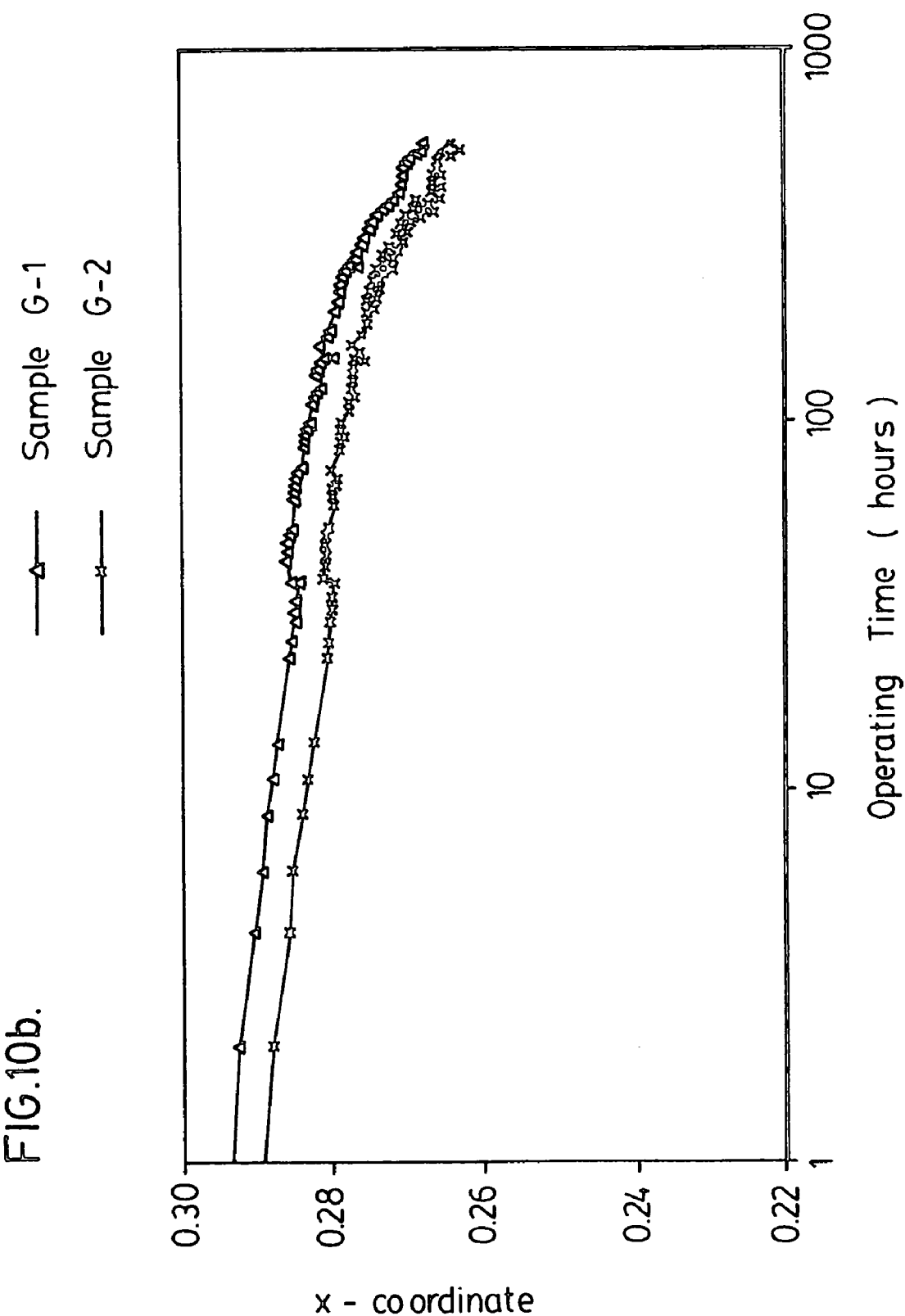

This example serves to show the stability of green light-emitting colour conversion photoluminescent layers with pigments particles formulated using melamine sulphonamide formaldehyde resins when they are deposited on and illuminated by a blue light from an electroluminescent device. Electroluminescent devices were constructed similar to those of example 6 except that the slurry batch for forming the colour conversion layers was made by mixing 37.5 grams of melamine suphonamide formaldehyde based resin impregnated with green coumarin dyes (BRIGHT YELLOW™ SR Conc. Series pigment from Radocolour) into 57.3 grams of acrylated melamine based, ultraviolet curable resin and 5.2 grams of the photoinitiator consisting of equal weights of 2,4,6 trimethyl benzoyl diphenyl phosphine oxide (TPO) dissolved in CIBA IRGACURE 1173®. The luminance and CIE x and y coordinates were measured as a function of operating time for both uncoated and coated devices. The green luminance from the coated pixel normalized to the initial luminance is shown labeled as sample G-1 in FIG. 10a and the corresponding CIE x and y coordinates also labeled as sample G1 are shown respectively in FIGS. 10b and 10c.

Example 9

This example serves to show the stability of green light-emitting colour conversion photoluminescent layers with pigments particles formulated using benzoguanamine formaldehyde resins when they are deposited on and illuminated by a bluelight from an electroluminescent device. Electroluminescent devices were constructed similar to those of example 6 except that the slurry batch for forming the colour conversion layers was made by mixing 37.5 grams of benzoguanamine formaldehyde based resin impregnated with green coumarin dyes (MC-CH5860 pigment from Radiant Color, U.S.A.) into 57.3 grams of acrylated melamine based, ultraviolet curable resin and 5.2 grams of the photoinitiator consisting of equal weights of 2,4,6 trimethyl benzoyl diphenyl phosphine oxide (TPO) dissolved in CIBA IRGACURE 1173®. The luminance and CIE x and y coordinates were measured as a function of operating time for both uncoated and coated devices. The green luminance from the coated pixel normalized to the initial luminance is shown labeled as sample G-2 in FIG. 10a and the corresponding CIE x and y coordinates also labeled as sample G-2 are shown respectively in FIGS. 10b and 10c.

Example 10

Figure 11:
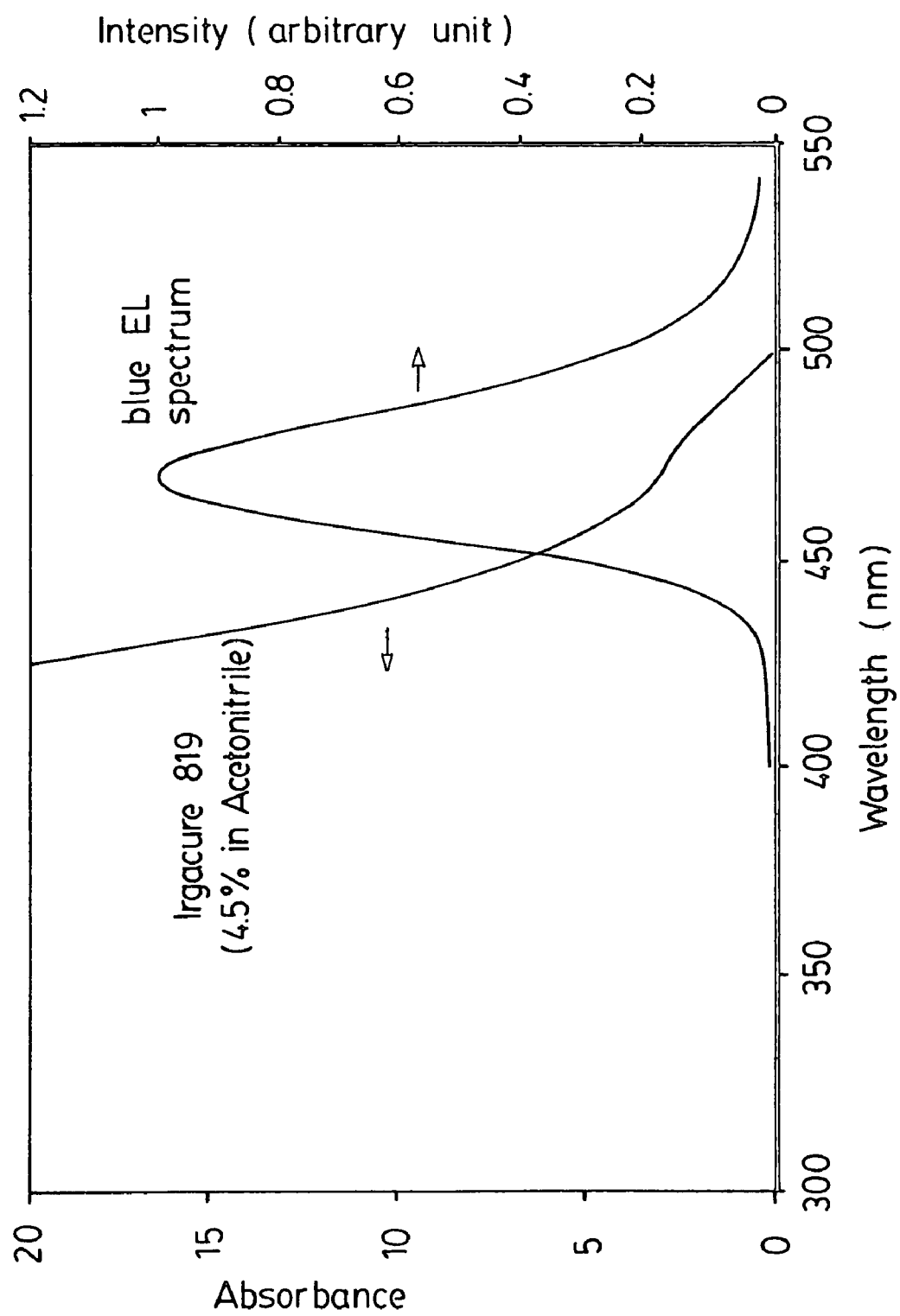
FIG. 11 shows the optical absorption spectrum for a solution of the photo-initiator CIBA IRGACURE® 819 dissolved in acetonitrile as compared to the emission characteristics of an electroluminescent device having a europium activated barium thioaluminate phosphor film.
Figure 12:
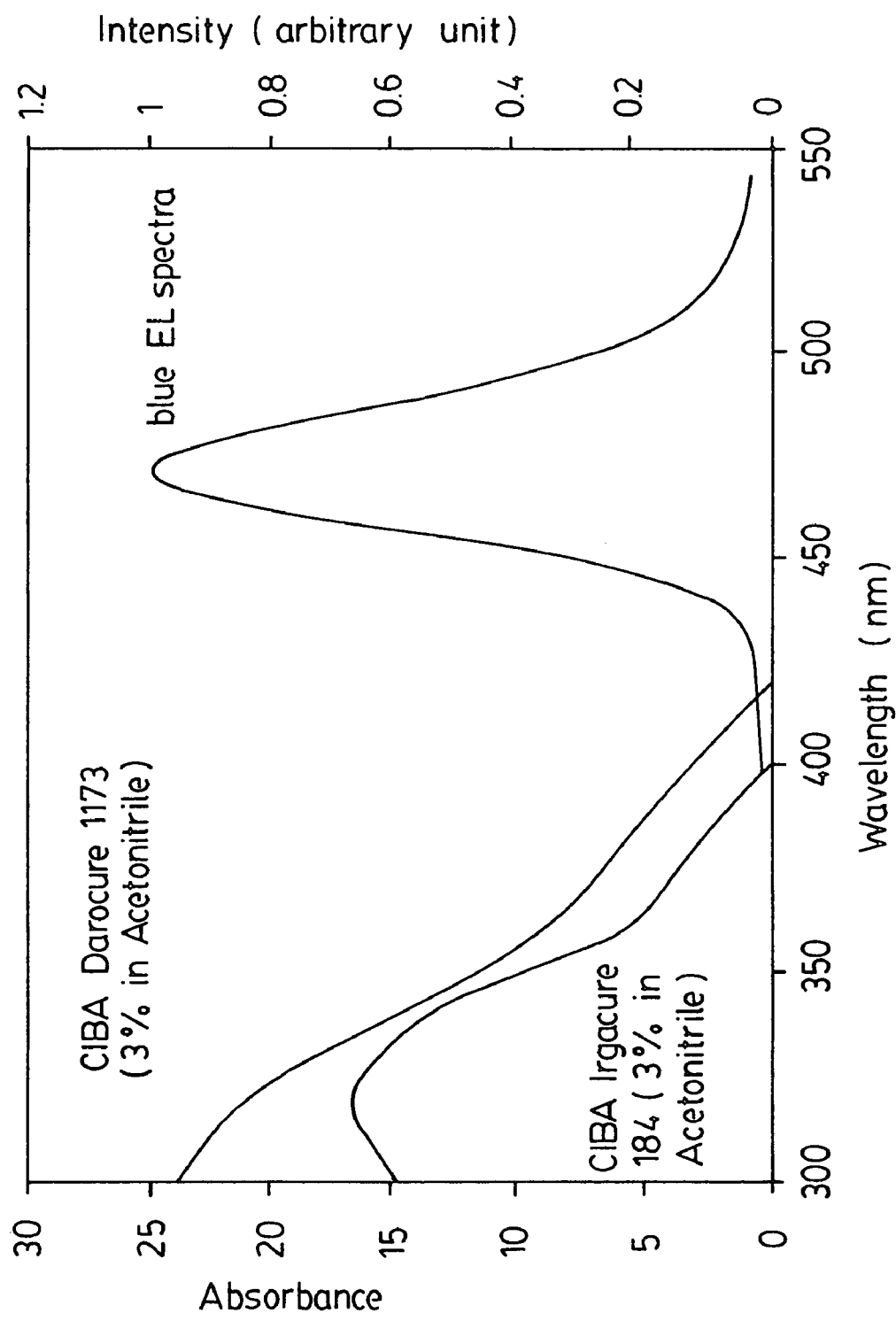
FIG. 12 shows the optical absorption spectra for solutions of the photo-initiators CIBA IRGACURE® 184 and CIBA DAROCURE® 1173 dissolved in acetonitrile as compared to the emission characteristics of an electroluminescent device having an europium activated barium thioaluminate phosphor film.

This example shows the optical absorption spectra for several photoinitiator formulations and their relationship to the emission spectrum of an electroluminescent device having a europium activated barium thioalumiante phosphor film that emits blue light. FIG. 11 shows the optical absorption spectra for solutions of the photoinitiator TPO in acetonitrile at a concentration similar to that of this photoinitiator as used in patternable colour conversion films as compared to the electroluminescent emission spectrum. As can be seen from the data, there is a significant overlap between the absorption spectrum of the photoinitiator and the electroluminescence emission spectrum, indicating that activation of the photoactivator may occur in colour conversion films containing residual quantities of this photoinitiator during electroluminescent illumination. FIG. 12 shows the optical absorption of CIBA IRGACURE 184® and CIBA IRGACURE 1173® dissolved in acetonitrile at concentrations similar to those used in the patternable colour conversion films of the present invention as compared to the emission characteristics of an electroluminescent device having a europium activated barium thioaluminate phosphor film. As can be seen from the data in this figure, there is no significant overlap between the absorption spectra of these photoinitiators and the electroluminescent emission spectrum. Thus activation of residual quantities of these photoactivators in the colour conversion films is less likely to occur during electroluminescent illumination as compared to the situation when photoactivators that absorb blue light are used. Activation of the photoinitators produces free radicals that are intended to cross-link the resin in the colour conversion film to facilitate photolithography, and if residual photoinitiator remains in the patterned layer, further exposure to blue light from the display or the ambient environment may produce further free radicals which can react with dyes in the pigments particles to degrade their optical performance. Therefore it is desirable to select photoinitiators that do not absorb blue light.

Although preferred embodiments of the invention have been described herein in detail, it will be understood by those skilled in the art that variations may be made thereto without departing from the spirit of the invention or the scope of the appended claims.

The invention claimed is:

1. A color-converting photoluminescent film, said film comprising a mixture of:
   (a) a clear UV curable resin and photo-initiator that does not substantially absorb blue light; and
   (b) a fluorescent pigment particle composition comprising at least one dye and a toluene sulfonamide melamine formaldehyde resin, wherein a molecular additive is provided in (a) and/or (b), and said molecular additive is selected from the group consisting of light stabilizers, ultraviolet absorbers (UVAs) and mixtures thereof, said light stabilizer is provided in an amount of about 0.1% to about 6% by weight by total weight of the pigment particles composition and said UVAs is provided in an amount of about 0.1% to about 5% by weight total of said pigment particle composition, and wherein said mixture is deposited onto a substrate to form a film and UV cured and wherein said light stabilizer is selected from the group consisting of hindered light amine stabilizer and nickel compounds.

2. The film of claim 1, wherein said light stabilizer is provided in an amount of about 2% to about 5% by weight by total weight of the pigment particle composition.

3. The film of claim 1, wherein said hindered amine light stabilizer is selected from the group consisting of a) Dimethyl succinate polymer with 4-hydroxy-2,2,6,6,-tetramethyl-1-piperidineethanol and N,N'''-[1,2-ethanediylbis[[[4.6-bis[butyl (1,2,2,6,6-pentamethyl-4-piperidinyl)amino]-1,3,5-triazine-2-yl]imino]-3,1-propanediyl]]-bis[N',N''-dibutyl-N',N''-bis (1,2,2,6,6-pentamethyl-4-piperidinyl)-1,3,5-Triazine-2,4,6-triamine]; b) bis-(1-Octyloxy-2,2,6,6,tetramethyl-4-piperidinyl) sebacate; c) Bis(1,2,2,6,6-pentamethyl-4-piperidyl) sebacate and Methyl 1,2,2,6,6-pentamethyl-4-piperidyl sebacate; d) Bis(1,2,2,6,6-pentamethyl-4-piperidyl) sebacate and Methyl 1,2,2,6,6-pentamethyl-4-piperidyl sebacate; e) Bis (1,2,2,6,6-pentamethyl-4-piperidinyl)-[[3,5-bis(1,1-dimethylethyl)-4-hydroxyphenyl] methyl]butylmalonate; and, f) N,N'''-[1,2-ethanediylbis [[[4.6-bis[butyl(1,2,2,6,6-pentamethyl-4-piperidinyl) amino]-1,3,5-triazine-2-yl]imino]-3,1-propanediyl]]-bis[N', N''-dibutyl-N',N''-bis(1,2,2,6,6-pentamethyl-4-piperidinyl)-1,3,5-Triazine-2,4,6-triamine].

4. The film of claim 1, wherein said hindered amine light stabilizer is selected from the group consisting of bis(2,2,6, 6-tetramethyl-4-piperidyl-)sebacate, dimethyl succinate-1-(2-hydroxyethyl)-4-hydroxy-2,2,6,6-tetramethylpiperidine polycondensate, poly[6-(1,1,3,3-tetramethylbutyl)imino-1, 3,-5-triazine-2,4-diyl][(2,2,6,6-tetramethyl-4-piperidyl) imino]hexamethylene[-2,2,6,6-tetram-ethyl-4-piperidyl) imide], tetrakis(2,2,6,6-tetramethyl-4-pi-peridyl)1,2,3,4-butane-tetracarboxylate, 2,2,6,6-tetramethyl-4-piperidyl benzoate, bis-(1,2,6,6-pentamethyl-4-piperidyl)-2-(3,5-di-t-butyl-4-hydro-xybenzyl)-2-n-butyl malonate, bis-(N-methyl-2,2,6,6-tetramethyl-4-piperidy-I)sebacate, 1,1'-(1,2-ethanediyl)bis(3,3,5,5-tetramethylpiperazinone), (mixed 2,2, 6,6-tetramethyl-4-piperidyl/tridecyl)1,2,3,4-butane-tetracarboxylate, (mixed 1,2,2,6,6-pentamethyl-4-piperidyl/ tridecyl)1,2,3,4-butane-tetracarboxylate, mixed [2,2,6,6-tetramethyl-4-piperidyl/.-beta.,.beta.,.b-eta.',.beta.'-tetramethyl-3,9-[2,4,8,10-tetroxaspiro(5,5)un-decane] diethyl-]1,2,3,4-butane-tetracarboxylate, mixed [1,2,2,6,6-pentamethyl-4-piperidyl-/.beta.,.beta.,.beta.',.. beta.'-tetramet-hyl-3,9-[2,4,8,10-tetroxaspiro(5,5-)undecane] diethyl]1,2,3,4-butane-tetracarboxylate, N,N'-bis(3-aminopropyl)ethylenediamine-2,4-bis[N-butyl-N-(1,2,2-,6, 6-pentamethyl-4-piperidyl)amino]-6-chloro-1,3,5-triazine condensate, poly[6-N-morpholyl-1,3,5-triazine-2,4-diyl][(2, 2,6,6-tetramethyl-4-piperi-1-dyl)imino]hexamethylene[(2, 2,6,6-tetramethyl-4-piperidyl)imide], N,N'-bis(2,2,6,6-tetramethyl-r-piperidyl)hexamethylenediamine/1,2-dibromo-1-ethane condensate, [N-(2,2,6,6-tetramethyl-4-piperidyl)-2-methyl-2-(2,2,6,-,-6-tetramethyl-4-piperidyl)imino] propionamide and mixtures thereof.

5. The film of claim 1, wherein said nickel compound is selected from the group consisting of nickel bis(octylphenyl) sulfide, [2,2'-thiobis(4-tert-octylphenolato)]-n-b-utylamine nickel, nickel dibutyldithiocarbamate, nickel complex-3,5-di-tert-butyl-4-hydroxybenzyl phosphate monoethylate and mixtures thereof.

6. The film of claim 1, wherein said ultraviolet absorber is selected from the group consisting of a) 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine; b) 3-(2H-benzotriazol-2-yl)-5-(1,1-dimethylethyl)-4-hydroxy-benzenepropanoic acid, C7-9-branched and linear alkyl esters; c) beta-[3-(2-H-Benzotriazole-2-yl)-4-hydroxy-5-tert.butylphenyl]-propionic acid poly(ethylene glycol) 300-ester and Bis{b-[3-(2-H-Benzotriazole-2-yl)-4-hydroxy-5-tert.butylphenyl]-propionic acid}-poly(ethylene glycol) 300-ester; d) 2-(2H-benzotriazol-2-yl)-6-dodecyl-4-methyl-phenol, branched and linear; e) 95% 3-(2H-benzotriazol-2-yl)-5-(1,1-dimethylethyl)-4-hydroxy-benzenepropanoic acid, C7-9-branched and linear alkyl esters and 5% 1-methoxy-2-propyl acetate; f) hydroxyphenyl-triazine—exact chemical composition is proprietary; g) 1:1 benzotriazole and hindered amine light stabilizer blend—exact chemical composition is proprietary; h) 2:1 benzotriazole and hindered amine light stabilizer blend—exact chemical composition is proprietary; i) 3-(2H-benzotriazol-2-yl)-5-(1,1-dimethylethyl)-4-hydroxy-benzenepropanoic acid, C7-9-branched and linear alkyl esters; j) 2-(2H-Benzotriazol-2-yl)-6-(1-methyl-1-phenylethyl)-4-(1,1,3,3-tetramethylbutyl)phenol; k) 2-[4-[(2-Hydroxy-3-(2'-ethyl) hexyl)oxy]-2-hydroxyphenyl]-4,6-bis(2,4-dimethylphenyl)-1,3,5-triazine; I) 2-(2H-benzotriazol-2-yl)-4,6-bis(1-methyl-1-phenylethyl)phenol; m) 1:1 benzotriazole and hindered amine light stabilizer blend—exact chemical composition is proprietary; and n) 2-hydroxy-4-(octyloxy)-phenyl methanone.

7. The film of claim 1, wherein said dye is selected from the group consisting of red and green fluorescent organic dyes.

8. The film of claim 7, wherein said dye is a red dye.

9. The film of claim 8, wherein said dye is selected from the group consisting of rhodamine dyes and perylene dyes.

10. The film of claim 7, wherein said dye is a green dye selected from the group consisting of coumarins, naphthalic acid derivatives and quinacridones.

11. The film of claim 1, wherein said UV cured composition is further subjected to thermal curing.

12. The film of claim 11, wherein said thermal curing is done at temperatures of about 80° C. to about 160° C. for about two hours or more.

13. The film of claim 1, wherein said film has a thickness of about 10 to about 100 micrometers.

14. The film of claim 1, wherein said film deposited on said substrate is done by a method selected from the group consisting of screen printing, stenciling and roll coating.

15. A color-converting photoluminescent film, said film comprising a mixture of:
(a) a clear UV curable resin and photo-initiator that does not substantially absorb blue light; and
(b) a fluorescent pigment particle composition comprising at least one dye present in an amount of from about 1% to about 8% by weight of said particle composition and a polymeric composition and having particles of a size such that the median particle diameter is greater than about 2.5 micrometers; wherein a molecular additive is provided in (a) and/or (b), and said molecular additive is selected from the group consisting of light stabilizers, ultraviolet absorbers (UVAs) and mixtures thereof, said light stabilizer is provided in an amount of about 0.1% to about 6% by weight by total weight of the pigment particles composition and said UVAs is provided in an amount of about 0.1% to about 5% by weight total of said pigment particle composition, and wherein said mixture is deposited onto a substrate to form a film and UV cured and wherein said light stabilizer is selected from the group consisting of hindered light amine stabilizer and nickel compounds.

16. The film of claim 15, wherein said particles are provided in an amount of about 20% to about 60% by weight of said resin, and said dye is a red dye.

17. The film of claim 15, wherein said particles are provided in an amount of about 10% to about 50% by weight of said resin, and said dye is a green dye.

* * * * *